(12) United States Patent
Zhang et al.

(10) Patent No.: US 10,761,289 B2
(45) Date of Patent: Sep. 1, 2020

(54) CAMERA LENS ASSEMBLY AND CAMERA DEVICE

(71) Applicant: ZHEJIANG SUNNY OPTICAL CO., LTD, Ningbo (CN)

(72) Inventors: Kaiyuan Zhang, Ningbo (CN); Jianke Wenren, Ningbo (CN); Ming Li, Ningbo (CN)

(73) Assignee: Zhejiang Sunny Optical Co., Ltd. (CN)

( * ) Notice: Subject to any disclaimer, the term of this patent is extended or adjusted under 35 U.S.C. 154(b) by 0 days.

(21) Appl. No.: 15/766,288

(22) PCT Filed: Apr. 20, 2017

(86) PCT No.: PCT/CN2017/081195
§ 371 (c)(1),
(2) Date: Apr. 5, 2018

(87) PCT Pub. No.: WO2018/103250
PCT Pub. Date: Jun. 14, 2018

(65) Prior Publication Data
US 2019/0278044 A1    Sep. 12, 2019

(30) Foreign Application Priority Data

Dec. 5, 2016  (CN) .......................... 2016 1 1100838

(51) Int. Cl.
*G02B 9/62*    (2006.01)
*G02B 7/02*    (2006.01)
(Continued)

(52) U.S. Cl.
CPC ............... *G02B 7/021* (2013.01); *G02B 9/62* (2013.01); *G02B 13/0045* (2013.01); *H04N 5/2254* (2013.01)

(58) Field of Classification Search
CPC ....... G02B 7/021; G02B 13/0045; G02B 9/62
See application file for complete search history.

(56) References Cited

U.S. PATENT DOCUMENTS 8,687,292 B2   4/2014  Tsai et al.
9,696,527 B2   7/2017  Wang
(Continued)

FOREIGN PATENT DOCUMENTS

CN   103529538 A   1/2014
CN   105676417 A   6/2016
(Continued)

OTHER PUBLICATIONS

Chinese Office Action (translated) for Chinese Patent Application No. 201611100838, dated May 28, 2018, 8 pgs.

*Primary Examiner* — Joseph P Martinez
(74) *Attorney, Agent, or Firm* — Barnes & Thornburg LP

(57) ABSTRACT

A camera lens assembly is provided. The camera lens assembly, comprises sequentially, from an object side to an image side along an optical axis, a first lens, multiple subsequent lenses, and a photosensitive element arranged on an image plane, wherein the first lens has a negative focal power and an object side surface of the first lens is a concave surface; and an axial distance from the object side surface of the first lens to the image plane TTL and ImgH, ImgH being half a diagonal length of an effective pixel area of the photosensitive element, satisfy: $1.5 < TTL/ImgH < 1.7$.

20 Claims, 12 Drawing Sheets

(51) Int. Cl.
*H04N 5/225* (2006.01)
*G02B 13/00* (2006.01)

(56) References Cited

U.S. PATENT DOCUMENTS

| | | |
|---|---|---|
| 9,829,683 B2 | 11/2017 | Chae |
| 2014/0009844 A1 | 1/2014 | Tsai et al. |
| 2015/0362709 A1 | 12/2015 | Wang |
| 2016/0147044 A1 | 5/2016 | Kondo |
| 2016/0154210 A1 | 6/2016 | Baik et al. |
| 2016/0161717 A1 | 6/2016 | Chae |
| 2017/0108666 A1* | 4/2017 | Lee .................... G02B 9/62 |

FOREIGN PATENT DOCUMENTS

| | | |
|---|---|---|
| CN | 105759406 A | 7/2016 |
| CN | 106019535 A | 10/2016 |
| CN | 106526801 A | 3/2017 |
| KR | 20160095935 A | 8/2016 |

\* cited by examiner

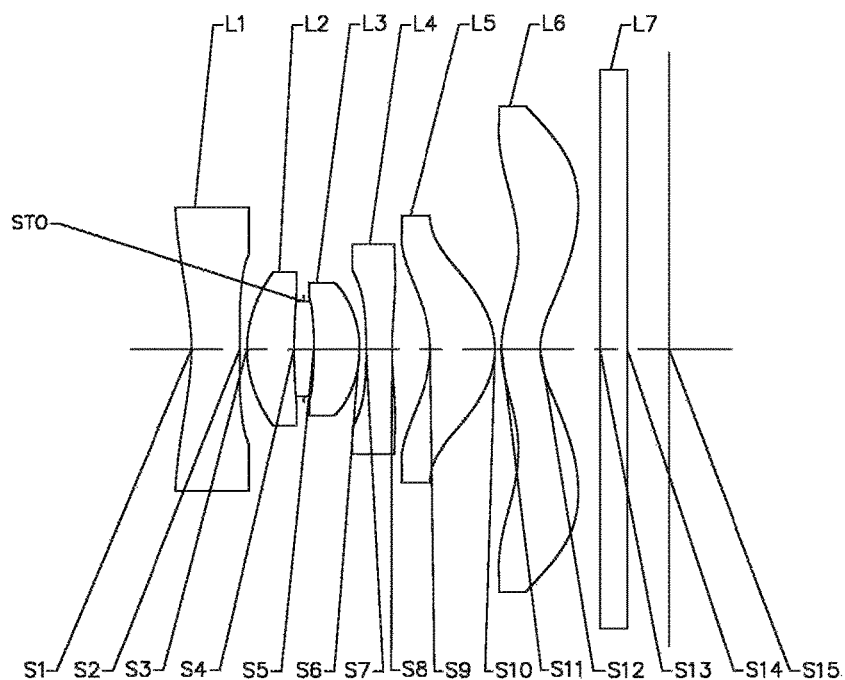
Fig. 1
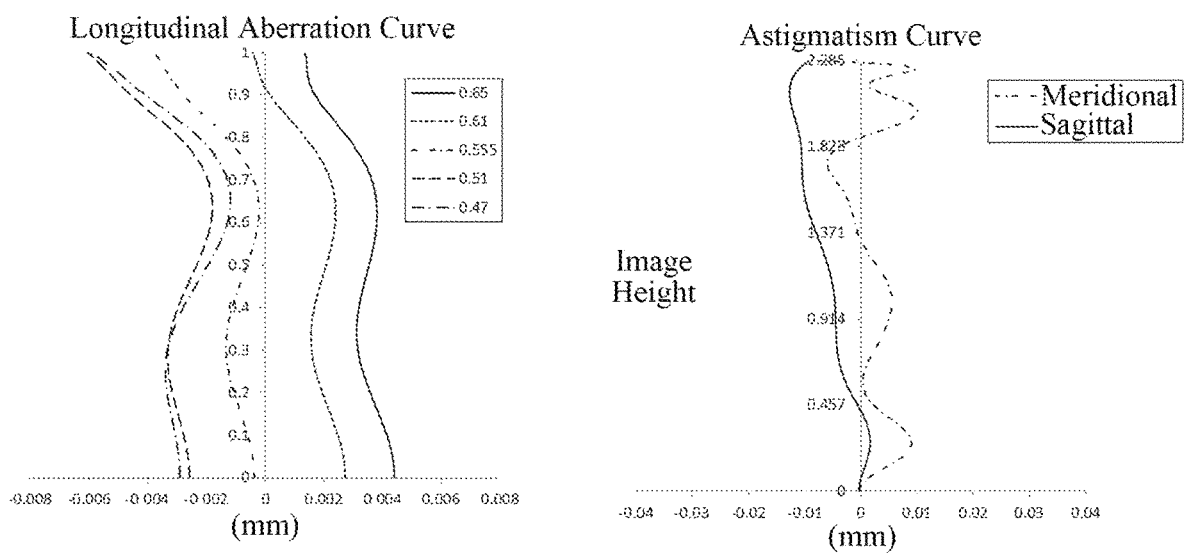
Fig. 2A
Fig. 2B

CAMERA LENS ASSEMBLY AND CAMERA DEVICE

CROSS-REFERENCE TO RELATED APPLICATIONS

This application is a U.S. national counterpart application of international application serial No. PCT/CN2017/081195 filed Apr. 20, 2017, which claims priority to Chinese Patent Application No. 201611100838.3, filed Dec. 5, 2016. The disclosures of both PCT/CN2017/081195 and Chinese Patent Application No. 201611100838.3 are hereby incorporated by reference.

TECHNICAL FIELD

The present application relates to a camera lens assembly and a camera device equipped with the camera lens assembly.

BACKGROUND

Image information is an important class of information that can be obtained by humans, and an optical lens is almost the only entry point for obtaining the image information. With the progress in science and technology, quality and information quantity of an image obtained by the population are continuously increasing. The quality of the image is mainly achieved by increasing the pixel sampling density of a photosensitive element. Therefore, an increase of an aperture in a system and an increase of transfer function of each field of view of the system are needed to meet the above requirement. The information quantity of the image obtained by the optical system may be represented by an optical invariant of the system, and the optical invariant of the system increases linearly with the field of view of the optical system.

Therefore, in order to increase the information quantity of the obtained image, a main approach is to increase the field of view of the optical system. At present, with the development of mobile phone lenses, consumers have higher and higher demands for selfies. Accordingly, it is quite necessary to develop a wide-angle lens assembly that has a large field of view and high resolution and is suitable for taking the selfie. Due to the height limit of the mobile phone lens, the length of the optical system is compressed as much as possible while taking the large field of view, the high resolution and high yield rate into account.

SUMMARY

The present application provides technical solutions that at least meet the above-mentioned requirements.

According to an aspect, the present application provides a camera lens assembly. The camera lens assembly, from an object side to an image side along an optical axis, includes sequentially: a first lens having a negative focal power, wherein an object side surface of the first lens is a concave surface; a second lens having a focal power, wherein an image side surface of the second lens is a concave surface; a third lens having a positive focal power, wherein an object side surface of the third lens is a concave surface, and an image side surface of the third lens is a convex surface; a fourth lens having a negative focal power, wherein an object side surface of the fourth lens is a concave surface; a fifth lens having a positive focal power, wherein an object side surface of the fifth lens is a concave surface, and an image side surface of the fifth lens is a convex surface; and a sixth lens having a focal power. The camera lens assembly further includes an electronic photosensitive element, arranged on an image plane along the optical axis.

According to an embodiment of the present application, an axial distance from the object side surface of the first lens to the image plane TTL and ImgH, ImgH being half a diagonal length of an effective pixel area of the photosensitive element, may satisfy: $1.5 < TTL/ImgH < 1.7$, for example, $1.583 \leq TTL/ImgH \leq 1.660$.

According to another aspect, a camera lens assembly provided by the present application, from an object side to an image side along an optical axis, includes sequentially: a first lens having a negative focal power, wherein an object side surface of the first lens is a concave surface; a second lens, of which an image side surface is a concave surface; a third lens having a positive focal power, wherein an object side surface of the third lens is a concave surface, and an image side surface of the third lens is a convex surface; a fourth lens having a negative focal power, wherein an object side surface of the fourth lens is a concave surface; a fifth lens having a positive focal power, wherein an object side surface of the fifth lens is a concave surface, and an image side surface of the fifth lens is a convex surface; and a sixth lens having a positive focal power or a negative focal power. An axial spacing distance between the third lens and the fourth lens T34 and an axial spacing distance between the fifth lens and the sixth lens T56 satisfy: $0.5 < T34/T56 < 1.2$, for example, $0.633 \leq T34/T56 \leq 1.118$.

According to an embodiment of the present application, for example, a half of a maximum field-of-view angle HFOV of the camera lens assembly may be set to: $HFOV > 50°$.

According to an embodiment of the present application, a center thickness of the second lens on the optical axis CT2 and a center thickness of the third lens on the optical axis CT3 may satisfy: $1 < CT2/CT3 < 1.5$, for example, $1.028 \leq CT2/CT3 \leq 1.424$.

According to an embodiment of the present application, an effective focal length of the fourth lens f4 and a total effective focal length of the camera lens assembly f may satisfy: $-2 < f4/f < -1$, for example, $-1.573 \leq f4/f \leq -1.336$.

According to an embodiment of the present application, an effective focal length of the third lens f3 and an effective focal length of the fifth lens f5 may satisfy: $0.4 < f3/f5 < 1$, for example, $0.458 \leq f3/f5 \leq 0.915$.

According to an embodiment of the present application, an axial distance between an intersection point of the object side surface of the fifth lens and the optical axis and a vertex of an effective radius of the object side surface of the fifth lens SAG51 and an axial distance from the object side surface of the first lens to the image plane TTL may satisfy: $-0.2 < SAG51/TTL < -0.1$, for example, $-0.144 \leq SAG51/TTL \leq -0.119$.

According to an embodiment of the present application, a radius of curvature of the object side surface of the fifth lens R9 and a radius of curvature of the image side surface of the fifth lens R10 may satisfy: $1 < R9/R10 < 1.5$, for example, $1.166 \leq R9/R10 \leq 1.419$.

According to an embodiment of the present application, an axial spacing distance between the third lens and the fourth lens T34 and an axial spacing distance between the fifth lens and the sixth lens T56 may satisfy: $0.5 < T34/T56 < 1.2$, for example, $0.633 \leq T34/T56 \leq 1.118$.

According to an embodiment of the present application, an effective radius of the object side surface of the first lens DT11 and an effective radius of the image side surface of the fifth lens DT52 may satisfy: 0.5<DT11/DT52<1.2, for example, 0.608≤DT11/DT52≤1.150.

According to another aspect, the present application provides a camera device, equipped with the camera lens assembly described above.

In the present application, multiple lenses (e.g., six lenses) having plastic aspheric surfaces are used. By reasonably distributing focal powers and surface forms of the multiple lenses, the viewing angle of the camera lens assembly can be effectively increased, and thus, miniaturization of the lens assembly can be ensured and image quality can be improved.

BRIEF DESCRIPTION OF THE DRAWINGS

The above and other advantages of the embodiments according to the present application will become apparent through detailed description given with reference to accompanying drawings, and the accompanying drawings are intended to illustrate exemplary embodiments of the present application, rather than a limitation to the exemplary embodiments of the present application. In the accompanying drawings:

FIG. 1 is a schematic structural diagram of a camera lens assembly according to Embodiment 1 of the present application;

FIG. 2A illustrates a longitudinal aberration curve of the camera lens assembly according to Embodiment 1;

FIG. 2B illustrates an astigmatism curve of the camera lens assembly according to Embodiment 1;

DETAILED DESCRIPTION OF EMBODIMENTS

Figure 2C:
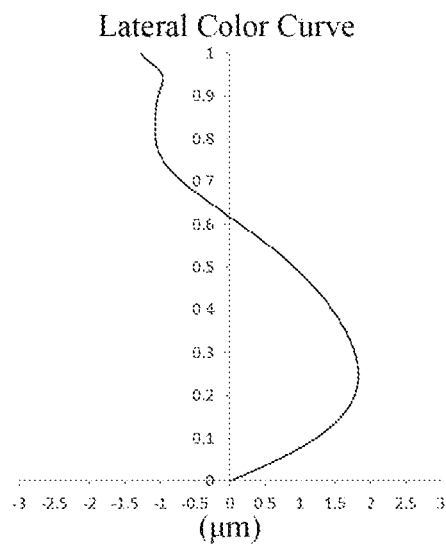
FIG. 2C illustrates a lateral color curve of the camera lens assembly according to Embodiment 1.

Various aspects of the present application will be described in more detail with reference to the accompanying drawings, so as to better understand the present application. It should be appreciated that the detailed description is merely an explanation for the exemplary embodiments of the present application, rather than a limitation to the scope of the present application in any way. The same reference numerals designate the same elements throughout this specification. The statement "and/or" includes any and all combinations of one or more of the associated listed items.

It should be noted that, in the Specification, statements, such as "first" and "second" are merely used to distinguish one characteristic from another characteristic, not to represent any limitations to characteristics. Thus, a first lens discussed below also could be termed a second lens without departing from the teachings of the present application.

In the accompanying drawings, for the convenience of description, thicknesses, dimensions and shapes of lenses have been slightly exaggerated. Specifically, spherical or aspheric shapes shown in the accompanying drawings are illustrated as examples. That is, spherical or aspheric shapes are not limited to the spherical or aspheric shapes shown in the accompanying drawings. The accompanying drawings are merely examples, not strictly drawn to scale.

In addition, an area near an axis indicates an area near an optical axis. The first lens is a lens closest to an object, and a sixth lens is a lens closest to a photosensitive element. In the present application, a surface closest to the object in each lens is referred to as an object side surface, and a surface closest to an image plane in each lens is referred to as an image side surface.

It will be further understood that the terms "comprising," "including," "having" and variants thereof, when used in this specification, specify the presence of stated characteristics, entireties, steps, operations, elements and/or components, but do not exclude the presence or addition of one or more other characteristics, entireties, steps, operations, elements, components and/or combinations thereof. In addition, expressions, such as "at least one of," when preceding a list of elements, modify the entire list of elements rather than an individual element in the list. Further, the use of "may," when describing embodiments of the present application, relates to "one or more embodiments of the present application." Also, the term "exemplary" is intended to refer to an example or illustration.

Unless otherwise defined, all terms (including technical and scientific terms) used herein have the same meaning as commonly understood by those of ordinary skill in the art to which the present application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Characteristics, principles and other aspects of the present application will be described below in detail.

A camera lens assembly according to an exemplary embodiment of the present application has a total effective focal length f, and may include a first lens, multiple subsequent lenses and a photosensitive element arranged in sequence from an object side to an image side along an optical axis.

In an exemplary embodiment, the first lens may have a negative focal power, and an object side surface of the first lens is a concave surface. An axial distance from the object side surface of the first lens to an image plane along the optical axis TTL and ImgH, ImgH being half a diagonal length of an effective pixel area of the electronic photosensitive element, may satisfy: $1.5<TTL/ImgH<1.7$, for example, $1.583 \leq TTL/ImgH \leq 1.660$. By reasonably setting the axial distance from the object side surface of the first lens to the image plane TTL, a total track length of the lens assembly can be restricted within a short range to ensure miniaturization of the system, so as to be used in a thin mobile phone lens. In a situation where a length of the system is less than the range, image quality is rapidly destroyed as the length of the system continues to decrease; and in a situation where the length of the system is greater than the range, an advantage of the lens assembly as an ultra-thin lens assembly applied in the mobile phone is lost.

In the exemplary embodiment, the multiple subsequent lenses may include a second lens and a third lens arranged in sequence from an image side surface of the first lens along the optical axis. An image side surface of the second lens may be a concave surface. The third lens may have a positive focal power and an effective focal length f3, an object side surface of the third lens may be a concave surface, and an image side surface of the third lens may be a convex surface. In application, thicknesses of the various lenses may be optimized. For instance, a center thickness of the second lens on the optical axis CT2 and a center thickness of the third lens on the optical axis CT3 may satisfy: $1<CT2/CT3<1.5$, for example, $1.028 \leq CT2/CT3 \leq 1.424$. By reasonably distributing the center thicknesses of the second lens and the third lens CT2 and CT3, it can be ensured that the optical system has a small length, thereby ensuring the miniaturization of the camera lens assembly.

In the exemplary embodiment, the multiple subsequent lenses may further include a fourth lens arranged at the image side surface of the third lens. An axial spacing distance between the third lens and the fourth lens may be defined as T34. The fourth lens may have a negative focal power and an effective focal length f4. An object side surface of the fourth lens may be a concave surface. The effective focal length of the fourth lens f4 and the total effective focal length of the camera lens assembly f may satisfy: $-2<f4/f<-1$, for example, $-1.573 \leq f4/f \leq -1.336$. As known by those skilled in the art, a spherical aberration is one of the most important factors which limit the resolution of the lens. In the present application, the fourth lens is configured to have a certain negative focal power, so that the spherical aberration can be effectively corrected, thereby improving the resolution of the camera lens assembly.

In another exemplary embodiment, the multiple subsequent lenses may further include a fifth lens and a sixth lens arranged in sequence from the image side surface of the third lens along the optical axis. In practice, axial spacing distances between various lenses may be optimized. For instance, the axial spacing distance between the third lens and the fourth lens T34 and an axial spacing distance between the fifth lens and the sixth lens T56 may satisfy: $0.5<T34/T56<1.2$, for example, $0.633 \leq T34/T56 \leq 1.118$. By reasonably setting the axial spacing distances between the various lenses, a third-order aberration can be corrected while ensuring the miniaturization of the camera lens assembly, thereby improving the image quality.

The fifth lens may have a positive focal power and an effective focal length f5. An object side surface of the fifth lens may be a concave surface, and an image side surface of the fifth lens may be a convex surface. The effective focal length of the fifth lens f5 and the effective focal length of the third lens f3 may satisfy: $0.4<f3/f5<1$, for example, $0.458 \leq f3/f5 \leq 0.915$, so that light can be smoothly deflected to the image plane to balance the aberration, thereby effectively improving the image quality.

In order to ensure that the camera lens assembly can be easily processed and formed, the shape of the fifth lens is required to be reasonably configured. For instance, an axial distance between an intersection point of the object side surface of the fifth lens and the optical axis and a vertex of an effective radius of the object side surface of the fifth lens SAG51 and the axial distance from the object side surface of the first lens to the image plane TTL may satisfy: $-0.2<SAG51/TTL<-0.1$, for example, $-0.144 \leq SAG51/TTL \leq -0.119$.

By reasonably setting a radius of curvature of the object side surface of the fifth lens R9 and a radius of curvature of the image side surface of the fifth lens R10, the spherical aberration of the fifth lens can be corrected, which can effectively ensure the image quality of the camera lens assembly. The radius of curvature of the object side surface of the fifth lens R9 and the radius of curvature of the image side surface of the fifth lens R10 may satisfy: $1<R9/R10<1.5$, for example, $1.166 \leq R9/R10 \leq 1.419$.

In addition, the first lens and the fifth lens may also be set, so that an effective radius of the object side surface of the first lens DT11 and an effective radius of the image side surface of the fifth lens DT52 satisfy: $0.5<DT11/DT52<1.2$, for example, $0.608 \leq DT11/DT52 \leq 1.150$. The effective radius of the image side surface of the fifth lens and the effective radius of the object side surface of the first lens are reasonably set, which can effectively correct the distortion, and is conducive to the forming of the camera lens assembly at the same time, so that surface accuracy is ensured.

In the specific application, a half of a maximum field-of-view angle HFOV of the camera lens assembly according to the present application may further be set to HFOV>50°. Accordingly, by reasonably distributing focal powers and surface forms of the lenses, the viewing angle of the camera lens assembly is effectively increased, and thus, the miniaturization of the lens assembly is ensured and the image quality is improved.

The camera lens assembly according to the embodiments of the present application may include multiple lenses, for example, the six lenses described above. By reasonably distributing focal powers and surface forms of various lenses, axial spacing distances between various lenses, and so on, the viewing angle of the camera lens assembly can be effectively increased to ensure the miniaturization of the lens assembly and improve the image quality, so that the camera lens assembly is more conducive to production and processing and can be applied to portable electronic products. In the embodiments of the present application, at least one of mirror surfaces of the lenses is an aspheric mirror surface. An aspheric lens is characterized in that its curvature continuously changes from the lens center to the periphery. In contrast to a spherical lens having a certain curvature from the lens center to the periphery, the aspheric lens has a better radius-of-curvature characteristic, has the advantages of reducing the distortion aberration and the astigmatism aberration, and can make the field of view wider and realer. The use of the aspheric lens can eliminate as much as possible the aberration that occurs during imaging, thereby improving the image quality.

However, it should be understood by those skilled in the art that, in a situation without departing from the technical solution sought to be protected by the present application, the number of lenses forming the lens assembly may be changed, to obtain various results and advantages described beneath. For instance, in the description of the first embodiment, a camera lens assembly having six lenses is described as an example, but the camera lens assembly is not limited to include six lenses. If necessary, the camera lens assembly may also include other numbers of lenses.

Specific embodiments applicable to the camera lens assembly of the above embodiments will be further described below with reference to FIG. 1 to FIG. 16C.

Embodiment 1

Embodiment 1 of the camera lens assembly according to the embodiments of the present application will be described below with reference to FIG. 1 to FIG. 2C.

As shown in FIG. 1, a camera lens assembly in Embodiment 1 includes a first lens L1 having an object side surface S1 and an image side surface S2, a second lens L2 having an object side surface S3 and an image side surface S4, a third lens L3 having an object side surface S5 and an image side surface S6, a fourth lens L4 having an object side surface S7 and an image side surface S8, a fifth lens L5 having an object side surface S9 and an image side surface S10, and a sixth lens L6 having an object side surface S11 and an image side surface S12. The camera lens assembly may further include a diaphragm (unshown) and a filter L7 having an object side surface S13 and an image side surface S14 and used for filtering out infrared light. In the camera lens assembly of this embodiment, an aperture STO may further be arranged to adjust the amount of light admitted. Light from an object sequentially passes through the surfaces S1 to S14 and finally forms an image on an image plane S15.

Table 1 below shows effective focal lengths of the lenses f1 to f6, a total effective focal length of the camera lens assembly f, a total track length of the camera lens TTL, and a half of a maximum field-of-view angle HFOV of the camera lens assembly in Embodiment 1.

Referring to Table 1, an effective focal length of the third lens L3 f3 and an effective focal length of the fifth lens L5 f5 may satisfy f3/f5=0.799. An effective focal length of the fourth lens L4 f4 and the total effective focal length of the camera lens assembly f may satisfy f4/f=−1.588. The half of the maximum field-of-view angle HFOV of the camera lens assembly may be set to HFOV=60.003°.

TABLE 1

| f1 (mm) | −4.18 | f (mm) | 1.81 |
|---|---|---|---|
| f2 (mm) | 2.37 | Fno | 2.50 |
| f3 (mm) | 1.86 | TTL (mm) | 3.69 |
| f4 (mm) | −2.83 | HFOV (°) | 60.003 |
| f5 (mm) | 2.33 | | |
| f6 (mm) | −4.26 | | |

Table 2 shows a surface form, a radius of curvature, a thickness, a material and a conic constant of each lens in this embodiment. Table 3 shows high-order coefficients $A_4, A_6, A_8, A_{10}, A_{12}, A_{16}$ and $A_{18}$ applicable to the aspheric surfaces S1-S12 of the aspheric lenses in this embodiment.

TABLE 2

| surface number | surface form | radius of curvature | thickness | material | conic constant |
|---|---|---|---|---|---|
| OBJ | spherical | infinite | infinite | | |
| S1 | aspheric | −1.6115 | 0.3725 | 1.544/56.11 | −13.1237 |
| S2 | aspheric | −5.9278 | 0.0556 | | −93.9130 |
| S3 | aspheric | 1.0460 | 0.3621 | 1.544/56.11 | 0.5667 |
| S4 | aspheric | 4.8181 | 0.0739 | | −76.9377 |
| STO | spherical | infinite | 0.0784 | | |
| S5 | aspheric | −4.9767 | 0.3522 | 1.544/56.11 | 69.8514 |
| S6 | aspheric | −0.8662 | 0.0500 | | −1.7153 |
| S7 | aspheric | −7.6598 | 0.2003 | 1.651/21.52 | −62.7705 |
| S8 | aspheric | 2.4729 | 0.2968 | | −0.2710 |
| S9 | aspheric | −0.8419 | 0.5052 | 1.544/56.11 | −3.8415 |
| S10 | aspheric | −0.6145 | 0.0500 | | −1.7589 |
| S11 | aspheric | 0.8343 | 0.3000 | 1.535/55.8 | −2.0198 |
| S12 | aspheric | 0.5344 | 0.4597 | | −3.0175 |
| S13 | spherical | infinite | 0.2100 | | |
| S14 | spherical | infinite | 0.3231 | | |
| S15 | spherical | infinite | | | |

Referring to Table 2 and Table 3, a center thickness of the second lens L2 on the optical axis CT2 and a center thickness of the third lens L3 on the optical axis CT3 satisfy: CT2/CT3=1.028. A radius of curvature of the object side surface S9 of the fifth lens R9 and a radius of curvature of the image side surface S10 of the fifth lens R10 satisfy: R9/R10=1.370.

TABLE 3

| surface number | A4 | A6 | A8 | A10 | A12 | A14 | A16 | A18 |
|---|---|---|---|---|---|---|---|---|
| S1 | 2.6389E−01 | −7.1287E−01 | 1.3916E+00 | −1.9015E+00 | 1.7904E+00 | −1.0946E+00 | 3.8814E−01 | −6.0288E−02 |
| S2 | 1.4224E+00 | −9.2565E+00 | 4.5454E+01 | −1.5545E+02 | 3.5934E+02 | −5.2582E+02 | 4.3656E+02 | −1.5530E+02 |
| S3 | 9.0054E−01 | −9.6856E+00 | 5.8831E+01 | −2.3937E+02 | 6.2446E+02 | −9.2459E+02 | 5.6473E+02 | 0.0000E+00 |
| S4 | 9.6315E−02 | −4.0693E−01 | −2.7420E+00 | 4.4751E+01 | −3.1293E+02 | 8.8750E+02 | −8.8919E+02 | 0.0000E+00 |

TABLE 3-continued

| surface number | A4 | A6 | A8 | A10 | A12 | A14 | A16 | A18 |
|---|---|---|---|---|---|---|---|---|
| S5 | −3.6015E−01 | −1.5037E+00 | 1.1638E+01 | −2.3663E+02 | 2.0722E+03 | −9.7481E+03 | 1.8234E+04 | 0.0000E+00 |
| S6 | −5.7870E−01 | 3.8650E−01 | 6.5744E−01 | −5.1917E+01 | 3.4511E+02 | −1.0927E+03 | 1.2872E+03 | 0.0000E+00 |
| S7 | −9.4547E−01 | 2.4951E+00 | −1.2486E+01 | 5.5808E+01 | −1.6961E+02 | 3.1686E+02 | −2.7944E+02 | 0.0000E+00 |
| S8 | −6.2083E−01 | 1.3250E+00 | −3.3444E+00 | 6.8775E+00 | −1.0515E+01 | 1.1382E+01 | −5.7592E+00 | 0.0000E+00 |
| S9 | 7.4773E−02 | −1.9764E+00 | 1.0729E+01 | −2.1760E+01 | 1.6658E+01 | 5.1586E+00 | −1.4508E+01 | 5.7764E+00 |
| S10 | −1.2278E−01 | −8.9754E−01 | 4.6535E+00 | −1.4247E+01 | 3.0938E+01 | −3.7545E+01 | 2.2635E+01 | −5.3238E+00 |
| S11 | −8.3790E−01 | 8.6289E−01 | −5.4325E−01 | 1.8165E−01 | −6.2297E−03 | −1.6251E−02 | 4.8740E−03 | −4.5176E−04 |
| S12 | −4.6756E−01 | 5.3653E−01 | −4.4753E−01 | 2.5759E−01 | −9.9906E−02 | 2.4213E−02 | −3.2447E−03 | 1.8198E−04 |

In this embodiment, an axial distance from the object side surface of the first lens L1 to the image plane along the optical axis TTL and ImgH, ImgH being half a diagonal length of an effective pixel area of the electronic photosensitive element, satisfy: TTL/ImgH=1.615. An axial spacing distance between the third lens L3 and the fourth lens L4 T34 and an axial spacing distance between the fifth lens L5 and the sixth lens L6 T56 satisfy: T34/T56=1. An axial distance between an intersection point of the object side surface of the fifth lens and the optical axis and a vertex of an effective radius of the object side surface of the fifth lens SAG51 and the axial distance from the object side surface of the first lens to the image plane TTL satisfy: SAG51/TTL=−0.137. An effective radius of the object side surface S1 of the first lens DT11 and an effective radius of the image side surface S10 of the fifth lens DT52 satisfy: DT11/DT52=1.058.

FIG. 2A illustrates a longitudinal aberration curve of the camera lens assembly according to Embodiment 1, representing deviations of focal points of light in different wavelengths converged after passing through an optical system. FIG. 2B illustrates an astigmatism curve of the camera lens assembly according to Embodiment 1, representing a curvature of a meridional image plane and a curvature of a sagittal image plane. FIG. 2C illustrates a lateral color curve of the camera lens assembly according to Embodiment 1, representing deviations of different image heights on an image plane after light passes through the camera lens assembly. It can be seen from FIG. 2A to FIG. 2C that the camera lens assembly provided in Embodiment 1 can achieve good image quality.

Embodiment 2

Embodiment 2 according to the above camera lens assembly of the present application is described below with reference to FIG. 3 to FIG. 4C. Except parameters of each lens of the camera lens assembly, for example, a radius of curvature, thickness, material, conic constant, effective focal length and axial spacing of each lens, and a high-order coefficient of each mirror surface, the arrangement of the camera lens assembly described in Embodiment 2 and the following embodiments is the same as that in Embodiment 1. For the purpose of brevity, the description of parts similar to those in Embodiment 1 will be omitted.

Figure 3:
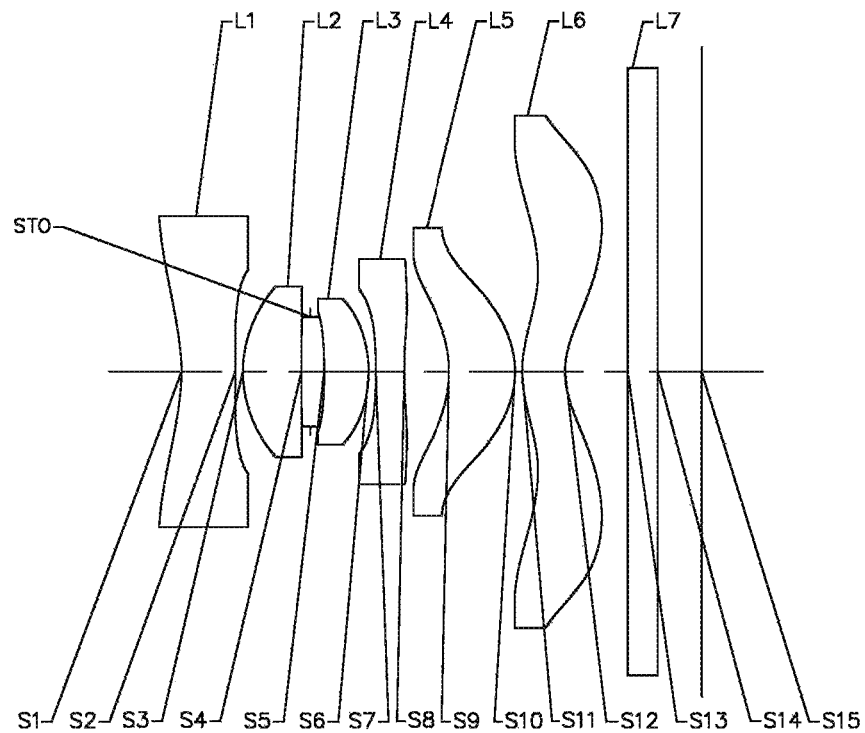
FIG. 3 is a schematic structural diagram of a camera lens assembly according to Embodiment 2 of the present application.

FIG. 3 is a schematic structural diagram of a camera lens assembly according to Embodiment 2. As shown in FIG. 3, the camera lens assembly according to Embodiment 2 includes a first lens to a sixth lens L1-L6 respectively having an object side surface, and an image side surface.

Table 4 below shows effective focal lengths of the lenses f1 to f6, a total effective focal length of the camera lens assembly f, a total track length of the camera lens TTL and a half of a maximum field-of-view angle HFOV of the camera lens assembly in Embodiment 2.

TABLE 4

| f1 (mm) | −2.90 | f (mm) | 1.88 |
|---|---|---|---|
| f2 (mm) | 1.68 | Fno | 2.54 |
| f3 (mm) | 2.06 | TTL (mm) | 3.65 |
| f4 (mm) | −2.75 | HFOV (°) | 59.884 |
| f5 (mm) | 3.04 | | |
| f6 (mm) | −5.14 | | |

Referring to Table 4, an effective focal length of the third lens L3 f3 and an effective focal length of the fifth lens L5 f5 may satisfy f3/f5=0.679. An effective focal length of the fourth lens L4 f4 and the total effective focal length of the camera lens assembly f may satisfy f4/f=−1.457. The half of the maximum field-of-view angle HFOV of the camera lens assembly may be set to HFOV=59.884°.

Table 5 shows a surface form, a radius of curvature, a thickness, a material and a conic constant of each lens in this embodiment. Table 6 shows high-order coefficients $A_4$, $A_6$, $A_8$, $A_{10}$, $A_{12}$, $A_{16}$ and $A_{18}$ applicable to the aspheric surfaces S1-S12 of the aspheric lenses in this embodiment.

Referring to Table 5 and Table 6, a center thickness of the second lens L2 on the optical axis CT2 and a center thickness of the third lens L3 on the optical axis CT3 satisfy CT2/CT3=1.317. A radius of curvature of the object side surface S9 of the fifth lens R9 and a radius of curvature of the image side surface S10 of the fifth lens R10 satisfy R9/R10=1.255.

TABLE 5

| surface number | surface form | radius of curvature | thickness | material | conic constant |
|---|---|---|---|---|---|
| OBJ | spherical | infinite | infinite | | |
| S1 | aspheric | −1.3622 | 0.3762 | 1.544/56.11 | −11.3142 |
| S2 | aspheric | −10.6811 | 0.0541 | | 79.4717 |
| S3 | aspheric | 0.8802 | 0.4099 | 1.544/56.11 | −0.0499 |
| S4 | aspheric | 18.1358 | 0.0629 | | −95.0000 |
| STO | spherical | infinite | 0.0973 | | |
| S5 | aspheric | −3.6761 | 0.3113 | 1.544/56.11 | 25.2468 |
| S6 | aspheric | −0.8878 | 0.0500 | | −0.9878 |
| S7 | aspheric | −5.0107 | 0.2000 | 1.651/21.52 | 66.8369 |
| S8 | aspheric | 2.8579 | 0.3180 | | −1.7256 |
| S9 | aspheric | −0.8318 | 0.4631 | 1.544/56.11 | −3.6482 |
| S10 | aspheric | −0.6630 | 0.0500 | | −1.6113 |
| S11 | aspheric | 0.8684 | 0.3000 | 1.535/55.8 | −1.8725 |
| S12 | aspheric | 0.5809 | 0.4406 | | −2.6529 |
| S13 | spherical | infinite | 0.2100 | 1.517/64.17 | |
| S14 | spherical | infinite | 0.3073 | | |
| S15 | spherical | infinite | | | |

In this embodiment, an axial distance from the object side surface of the first lens L1 to the image plane along the optical axis TTL and ImgH, ImgH being half a diagonal length of an effective pixel area of the electronic photosensitive element, satisfy TTL/ImgH=1.601. An axial spacing distance between the third lens L3 and the fourth lens L4 T34 and an axial spacing distance between the fifth lens L5 and the sixth lens L6 T56 satisfy T34/T56=1. An axial distance between an intersection point of the object side surface of the fifth lens and the optical axis and a vertex of an effective radius of the object side surface of the fifth lens SAG51 and the axial distance from the object side surface of the first lens to the image plane TTL satisfy SAG51/TTL=−0.140. An effective radius of the object side surface S1 of the first lens DT11 and an effective radius of the image side surface S10 of the fifth lens DT52 satisfy DT11/DT52=1.082.

the maximum field-of-view angle HFOV of the camera lens assembly may be set to HFOV=59.889°.

TABLE 7

| f1 (mm) | −2.86 | f (mm) | 1.88 |
|---|---|---|---|
| f2 (mm) | 1.63 | Fno | 2.53 |
| f3 (mm) | 2.04 | TTL (mm) | 3.64 |
| f4 (mm) | −2.65 | HFOV (°) | 59.889 |
| f5 (mm) | 2.90 | | |
| f6 (mm) | −4.70 | | |

Table 8 shows a surface form, a radius of curvature, a thickness, a material and a conic constant of each lens in this embodiment. Table 9 shows high-order coefficients $A_4$, $A_6$,

TABLE 6

| surface number | A4 | A6 | A8 | A10 | A12 | A14 | A16 | A18 |
|---|---|---|---|---|---|---|---|---|
| S1 | 1.4446E−01 | −2.7709E−01 | 4.6887E−01 | −5.4289E−01 | 4.0638E−01 | −1.7522E−01 | 3.3411E−02 | −6.3844E−04 |
| S2 | 8.8748E−01 | −4.4453E+00 | 2.2580E+01 | −8.2701E+01 | 2.1576E+02 | −3.7165E+02 | 3.7868E+02 | −1.6992E+02 |
| S3 | 2.1963E−01 | −3.1884E+00 | 1.6077E+01 | −3.9930E+01 | 2.6507E+01 | 8.7368E+01 | −1.3961E+02 | 0.0000E+00 |
| S4 | −3.9739E−02 | −1.5971E−01 | −7.5945E−02 | 1.0151E+00 | −1.2475E+00 | 5.8515E−01 | −9.7371E−02 | 0.0000E+00 |
| S5 | −2.6992E−01 | −9.8511E−01 | −6.0480E+00 | 5.2683E+01 | −2.5543E+02 | −1.0529E+02 | 2.2048E+03 | 0.0000E+00 |
| S6 | −1.3573E−01 | −2.3942E+00 | 1.9187E+01 | −1.7643E+02 | 9.7526E+02 | −2.8743E+03 | 3.3787E+03 | 0.0000E+00 |
| S7 | −5.6830E−01 | −6.4090E−01 | 4.9951E+00 | −2.4483E+01 | 9.5805E+01 | −1.9534E+02 | 1.3615E+02 | 0.0000E+00 |
| S8 | −5.4750E−01 | 7.9971E−01 | −1.7061E+00 | 4.0680E+00 | −6.0927E+00 | 6.2136E+00 | −3.3374E+00 | 0.0000E+00 |
| S9 | 1.0385E−02 | −2.7217E+00 | 1.2897E+01 | −2.6799E+01 | 3.3156E+01 | −2.4901E+01 | 1.0224E+01 | −1.7361E+00 |
| S10 | −1.0742E−01 | −1.0467E+00 | 4.7877E+00 | −1.5514E+01 | 3.6295E+01 | −4.6127E+01 | 2.8775E+01 | −6.9824E+00 |
| S11 | −8.3495E−01 | 4.7801E−01 | 2.8433E−01 | −6.2492E−01 | 4.3129E−01 | −1.5298E−01 | 2.8015E−02 | −2.1016E−03 |
| S12 | −5.5582E−01 | 6.0125E−01 | −4.6713E−01 | 2.4543E−01 | −8.1413E−02 | 1.4142E−02 | −6.6661E−04 | −6.9308E−05 |

Figure 4A:
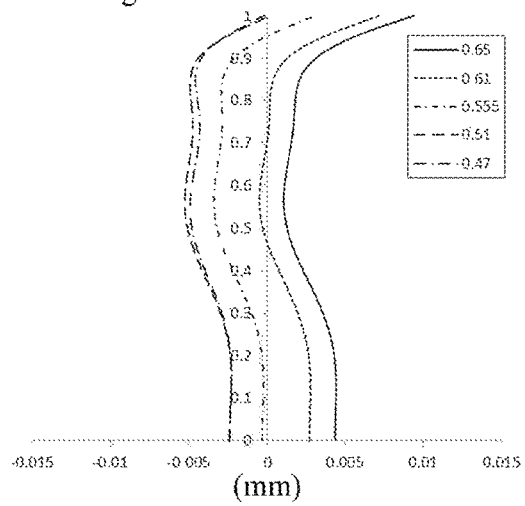
FIG. 4A illustrates a longitudinal aberration curve of the camera lens assembly according to Embodiment 2.
Figure 4B:
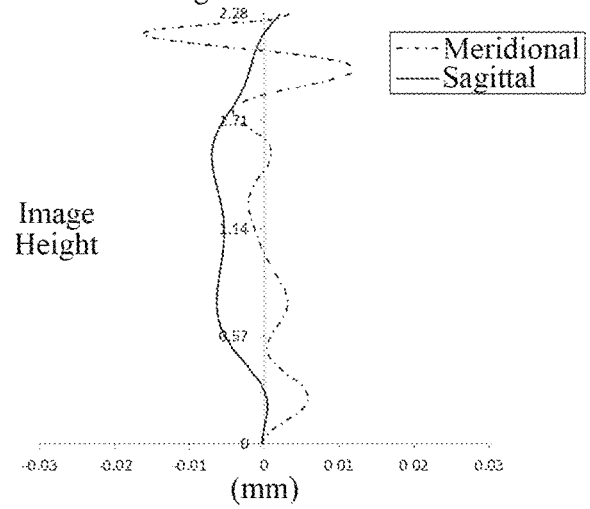
FIG. 4B illustrates an astigmatism curve of the camera lens assembly according to Embodiment 2.
Figure 4C:
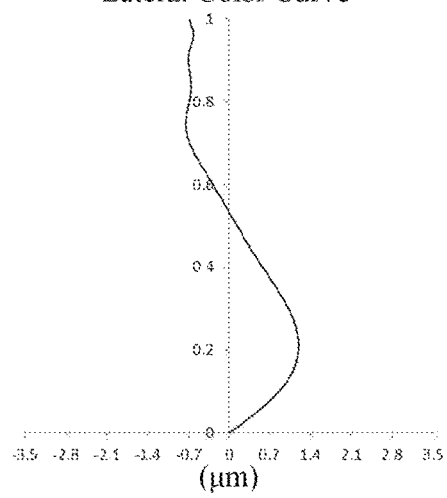
FIG. 4C illustrates a lateral color curve of the camera lens assembly according to Embodiment 2.

FIG. 4A illustrates a longitudinal aberration curve of the camera lens assembly according to Embodiment 2, representing deviations of focal points of light in different wavelengths converged after passing through an optical system. FIG. 4B illustrates an astigmatism curve of the camera lens assembly according to Embodiment 2, representing a curvature of a meridional image plane and a curvature of a sagittal image plane. FIG. 4C illustrates a lateral color curve of the camera lens assembly according to Embodiment 2, representing deviations of different image heights on an image plane after light passes through the camera lens assembly. It can be seen from FIG. 4A to FIG. 4C that the camera lens assembly provided in Embodiment 2 can achieve good image quality.

Embodiment 3

Figure 5:
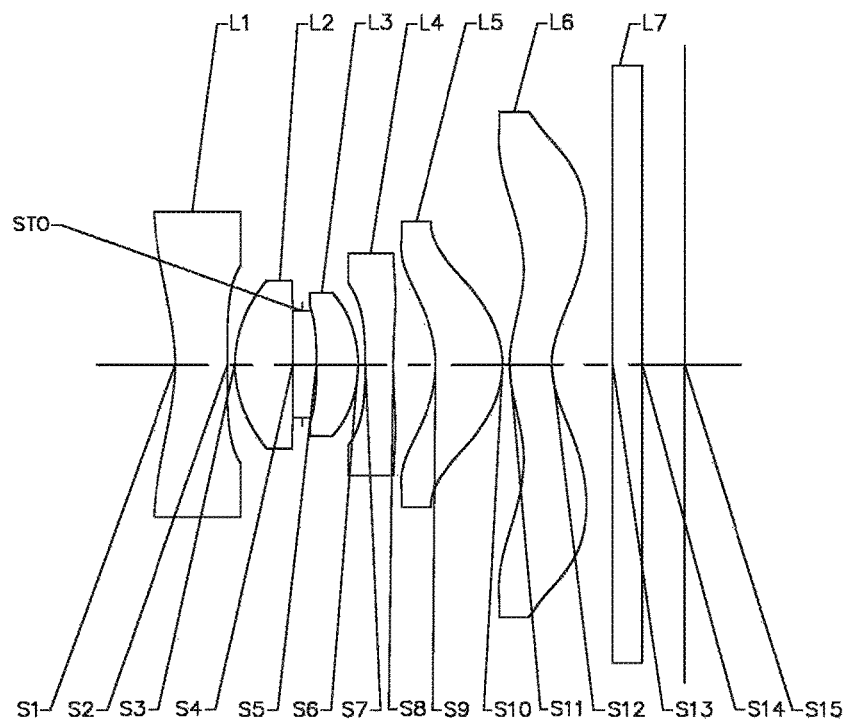
FIG. 5 is a schematic structural diagram of a camera lens assembly according to Embodiment 3 of the present application.

Embodiment 3 according to the above camera lens assembly of the present application will be described below with reference to FIG. 5 to FIG. 6C. FIG. 5 is a schematic structural diagram of a camera lens assembly according to Embodiment 3 of the present application. As shown in FIG. 5, the camera lens assembly according to Embodiment 3 includes a first lens to a sixth lens L1-L6 respectively having an object side surface, and an image side surface.

Table 7 below shows effective focal lengths of the lenses f1 to f6, a total effective focal length of the camera lens assembly f, a total track length of the camera lens TTL and a half of a maximum field-of-view angle HFOV of the camera lens assembly in Embodiment 3.

Referring to Table 7, an effective focal length of the third lens L3 f3 and an effective focal length of the fifth lens L5 f5 may satisfy f3/f5=0.702. An effective focal length of the fourth lens L4 f4 and the total effective focal length of the camera lens assembly f may satisfy f4/f=−1.408. The half of $A_8$, $A_{10}$, $A_{12}$, $A_{16}$ and $A_{18}$ applicable to the aspheric surfaces S1-S12 of the aspheric lenses in this embodiment.

Referring to Table 8 and Table 9, a center thickness of the second lens L2 on the optical axis CT2 and a center thickness of the third lens L3 on the optical axis CT3 satisfy CT2/CT3=1.400. A radius of curvature of the object side surface S9 of the fifth lens R9 and a radius of curvature of the image side surface S10 of the fifth lens R10 satisfy R9/R10=1.259.

TABLE 8

| surface number | surface form | radius of curvature | thickness | material | conic constant |
|---|---|---|---|---|---|
| OBJ | spherical | infinite | infinite | | |
| S1 | aspheric | −1.3569 | 0.3734 | 1.544/56.11 | −11.3505 |
| S2 | aspheric | −11.2388 | 0.0518 | | −10.7734 |
| S3 | aspheric | 0.8798 | 0.4151 | 1.544/56.11 | −0.1448 |
| S4 | aspheric | 68.1962 | 0.0655 | | 95.0000 |
| STO | spherical | infinite | 0.1034 | | |
| S5 | aspheric | −3.2513 | 0.2965 | 1.544/56.11 | 27.6669 |
| S6 | aspheric | −0.8556 | 0.0500 | | −1.3010 |
| S7 | aspheric | −4.2561 | 0.2000 | 1.651/21.52 | −3.3675 |
| S8 | aspheric | 3.0032 | 0.3064 | | −1.6824 |
| S9 | aspheric | −0.8240 | 0.4831 | 1.544/56.11 | −3.7332 |
| S10 | aspheric | −0.6543 | 0.0500 | | −1.6097 |
| S11 | aspheric | 0.9022 | 0.3000 | 1.535/55.8 | −1.8755 |
| S12 | aspheric | 0.5875 | 0.4365 | | −2.6798 |
| S13 | spherical | infinite | 0.2100 | 1.517/64.17 | |
| S14 | spherical | infinite | 0.3032 | | |
| S15 | spherical | infinite | | | |

In this embodiment, an axial distance from the object side surface of the first lens L1 to the image plane along the optical axis TTL and ImgH, ImgH being half a diagonal length of an effective pixel area of the electronic photosensitive element, satisfy TTL/ImgH=1.599. An axial spacing distance between the third lens L3 and the fourth lens L4 T34 and an axial spacing distance between the fifth lens L5 and the sixth lens L6 T56 satisfy T34/T56=1. An axial distance between an intersection point of the object side surface of the fifth lens and the optical axis and a vertex of an effective radius of the object side surface of the fifth lens SAG51 and the axial distance from the object side surface of the first lens to the image plane TTL satisfy SAG51/TTL=−0.142. An effective radius of the object side surface S1 of the first lens DT11 and an effective radius of the image side surface S10 of the fifth lens DT52 satisfy DT11/DT52=1.069.

Referring to Table 10, an effective focal length of the third lens L3 f3 and an effective focal length of the fifth lens L5 f5 may satisfy f3/f5=0.709. An effective focal length of the fourth lens L4 f4 and the total effective focal length of the camera lens assembly f may satisfy f4/f=−1.437. The half of the maximum field-of-view angle HFOV of the camera lens assembly may be set to HFOV=60.005°.

Table 11 shows a surface form, a radius of curvature, a thickness, a material and a conic constant of each lens in this embodiment. Table 12 shows high-order coefficients $A_4$, $A_6$,

TABLE 9

| surface number | A4 | A6 | A8 | A10 | A12 | A14 | A16 | A18 |
|---|---|---|---|---|---|---|---|---|
| S1 | 1.4800E−01 | −2.9010E−01 | 4.9138E−01 | −5.5453E−01 | 3.9484E−01 | −1.5623E−01 | 2.3713E−02 | 1.1707E−03 |
| S2 | 9.4112E−01 | −4.7952E+00 | 2.4133E+01 | −8.7244E+01 | 2.2646E+02 | −3.9161E+02 | 4.0362E+02 | −1.8441E+02 |
| S3 | 2.8150E−01 | −3.3965E+00 | 1.5728E+01 | −2.9620E+01 | −2.8769E+01 | 2.2103E+02 | −2.8285E+02 | 0.0000E+00 |
| S4 | −5.0927E−02 | −4.4316E−01 | 3.6254E+00 | −2.8974E+01 | 1.2287E+02 | −2.8844E+02 | 2.6811E+02 | 0.0000E+00 |
| S5 | −2.5285E−01 | −4.7337E−01 | −1.5738E+00 | 1.5977E+00 | −8.9602E+02 | 1.8243E+03 | 3.5758E+01 | 0.0000E+00 |
| S6 | −3.2796E−02 | −4.8694E+00 | 5.2851E+01 | −4.6089E+02 | 2.3640E+03 | −6.4791E+03 | 7.2489E+03 | 0.0000E+00 |
| S7 | −5.5936E−01 | −1.7262E+00 | 1.4207E+01 | −7.9585E+01 | 2.7297E+02 | −4.8105E+02 | 2.8824E+02 | 0.0000E+00 |
| S8 | −5.7804E−01 | 9.2619E−01 | −1.8814E+00 | 3.6386E+00 | −3.6078E+00 | 2.0410E+00 | −9.5274E−01 | 0.0000E+00 |
| S9 | −5.7374E−02 | −2.5428E+00 | 1.3321E+01 | −2.8525E+01 | 3.5208E+01 | −2.5979E+01 | 1.0457E+01 | −1.7466E+00 |
| S10 | −1.1987E−01 | −8.5164E−01 | 3.4418E+00 | −1.0490E+01 | 2.6212E+01 | −3.5172E+01 | 2.2678E+01 | −5.6168E+00 |
| S11 | −8.3153E−01 | 4.1252E−01 | 4.6066E−01 | −8.4863E−01 | 5.8545E−01 | −2.1214E−01 | 3.9921E−02 | −3.0831E−03 |
| S12 | −5.7251E−01 | 6.3574E−01 | −5.0764E−01 | 2.7489E−01 | −9.4451E−02 | 1.7256E−02 | −9.7499E−04 | −6.6872E−05 |

Figure 6A:
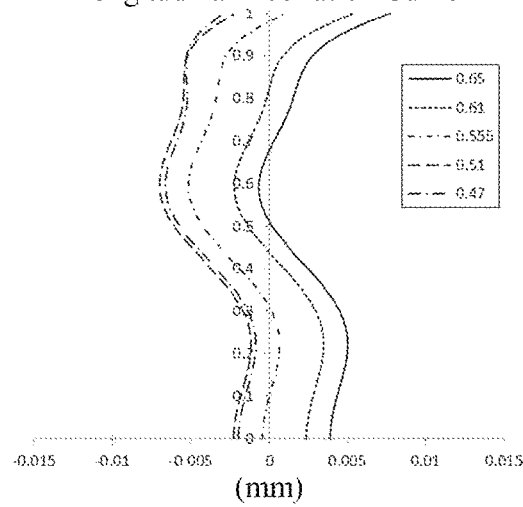
FIG. 6A illustrates a longitudinal aberration curve of the camera lens assembly according to Embodiment 3.
Figure 6B:
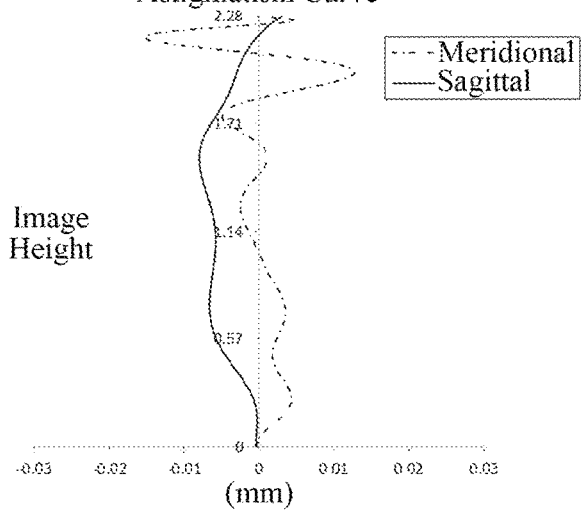
FIG. 6B illustrates an astigmatism curve of the camera lens assembly according to Embodiment 3.
Figure 6C:
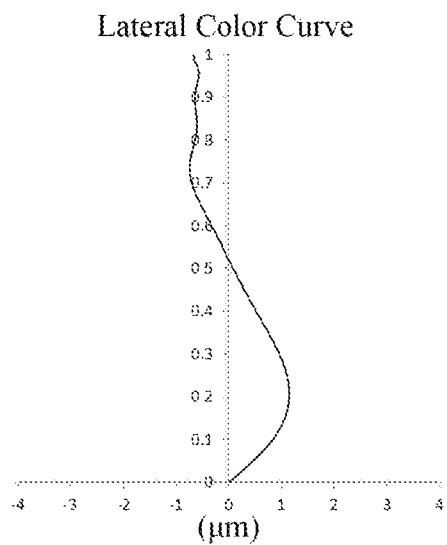
FIG. 6C illustrates a lateral color curve of the camera lens assembly according to Embodiment 3.

FIG. 6A illustrates a longitudinal aberration curve of the camera lens assembly according to Embodiment 3, representing deviations of focal points of light in different wavelengths converged after passing through an optical system. FIG. 6B illustrates an astigmatism curve of the camera lens assembly according to Embodiment 3, representing a curvature of a meridional image plane and a curvature of a sagittal image plane. FIG. 6C illustrates a lateral color curve of the camera lens assembly according to Embodiment 3, representing deviations of different image heights on an image plane after light passes through the camera lens assembly. It can be seen from FIG. 6A to FIG. 6C that the camera lens assembly provided in Embodiment 3 can achieve good image quality.

Embodiment 4

Figure 7:
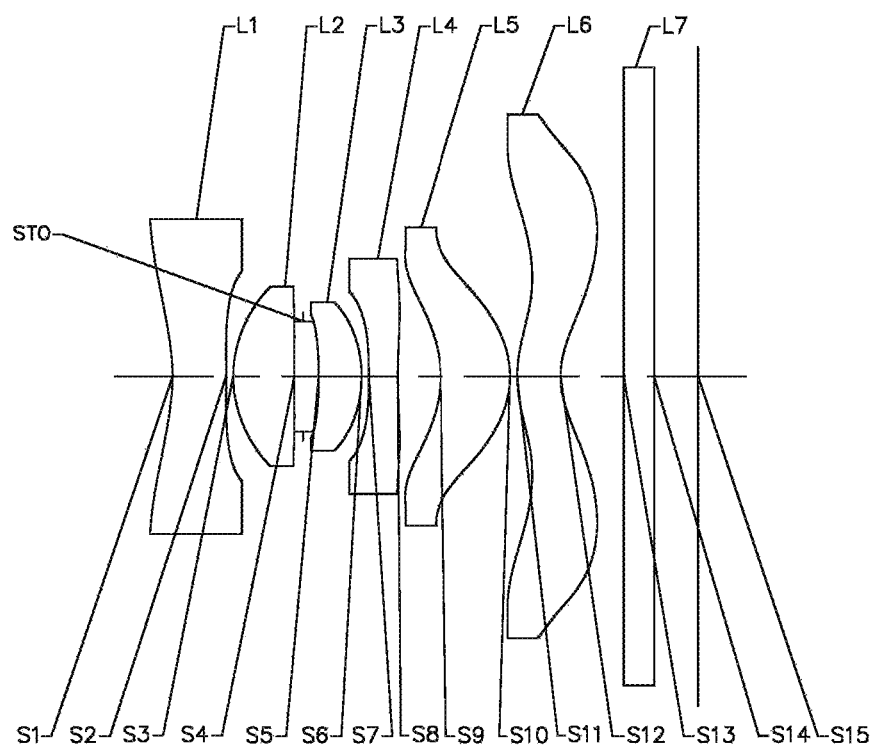
FIG. 7 is a schematic structural diagram of a camera lens assembly according to Embodiment 4 of the present application.

Embodiment 4 according to the above camera lens assembly of the present application will be described below with reference to FIG. 7 to FIG. 8C. FIG. 7 is a schematic structural diagram of a camera lens assembly according to Embodiment 4 of the present application. As shown in FIG. 7, the camera lens assembly according to Embodiment 4 includes a first lens to a sixth lens L1-L6 respectively having an object side surface, and an image side surface.

Table 10 below shows effective focal lengths of the lenses f1 to f6, a total effective focal length of the camera lens assembly f, a total track length of the camera lens TTL and a half of a maximum field-of-view angle HFOV of the camera lens assembly in Embodiment 4.

TABLE 10

| f1 (mm) | −2.73 | f (mm) | 1.88 |
|---|---|---|---|
| f2 (mm) | 1.58 | Fno | 2.53 |
| f3 (mm) | 2.09 | TTL (mm) | 3.65 |
| f4 (mm) | −2.71 | HFOV (°) | 60.005 |
| f5 (mm) | 2.94 | | |
| f6 (mm) | −4.83 | | |

$A_8$, $A_{10}$, $A_{12}$, $A_{16}$ and $A_{18}$ applicable to the aspheric surfaces S1-S12 of the aspheric lenses in this embodiment.

Referring to Table 11 and Table 12, a center thickness of the second lens L2 on the optical axis CT2 and a center thickness of the third lens L3 on the optical axis CT3 satisfy CT2/CT3=1.424. A radius of curvature of the object side surface S9 of the fifth lens R9 and a radius of curvature of the image side surface S10 of the fifth lens R10 satisfy R9/R10=1.254.

TABLE 11

| surface number | surface form | radius of curvature | thickness | material | conic constant |
|---|---|---|---|---|---|
| OBJ | spherical | infinite | infinite | | |
| S1 | aspheric | −1.3464 | 0.3703 | 1.544/56.11 | −11.6584 |
| S2 | aspheric | −15.1731 | 0.0500 | | −24.0654 |
| S3 | aspheric | 0.8560 | 0.4242 | 1.544/56.11 | −0.1287 |
| S4 | aspheric | 108.0227 | 0.0621 | | −95.0000 |
| STO | spherical | infinite | 0.1060 | | |
| S5 | aspheric | −3.1276 | 0.2979 | 1.544/56.11 | 29.5155 |
| S6 | aspheric | −0.8626 | 0.0500 | | −1.1074 |
| S7 | aspheric | −4.0845 | 0.2000 | 1.651/21.52 | 4.1158 |
| S8 | aspheric | 3.2044 | 0.2991 | | −2.1626 |
| S9 | aspheric | −0.8251 | 0.4838 | 1.544/56.11 | −3.7792 |
| S10 | aspheric | −0.6578 | 0.0500 | | −1.6039 |
| S11 | aspheric | 0.8911 | 0.3000 | 1.535/55.8 | −1.7815 |
| S12 | aspheric | 0.5851 | 0.4385 | | −2.6172 |
| S13 | spherical | infinite | 0.2100 | 1.517/64.17 | |
| S14 | spherical | infinite | 0.3052 | | |
| S15 | spherical | infinite | | | |

In this embodiment, an axial distance from the object side surface of the first lens L1 to the image plane along the optical axis TTL and ImgH, ImgH being half a diagonal length of an effective pixel area of the electronic photosensitive element, satisfy TTL/ImgH=1.596. An axial spacing distance between the third lens L3 and the fourth lens L4 T34 and an axial spacing distance between the fifth lens L5 and the sixth lens L6 T56 satisfy T34/T56=1. An axial distance between an intersection point of the object side surface of the fifth lens and the optical axis and a vertex of an effective radius of the object side surface of the fifth lens SAG51 and the axial distance from the object side surface of the first lens to the image plane TTL satisfy SAG51/TTL=−0.142. An effective radius of the object side surface S1 of the first lens DT11 and an effective radius of the image side surface S10 of the fifth lens DT52 satisfy DT11/DT52=1.057.

f5 may satisfy f3/f5=0.786. An effective focal length of the fourth lens L4 f4 and the total effective focal length of the camera lens assembly f may satisfy f4/f=−1.363. The half of the maximum field-of-view angle HFOV of the camera lens assembly may be set to HFOV=60.008°.

TABLE 12

| surface number | A4 | A6 | A8 | A10 | A12 | A14 | A16 | A18 |
|---|---|---|---|---|---|---|---|---|
| S1 | 1.4053E−01 | −2.6281E−01 | 4.2243E−01 | −4.4294E−01 | 2.7908E−01 | −8.3618E−02 | −7.8064E−04 | 4.4890E−03 |
| S2 | 8.8523E−01 | −4.4949E+00 | 2.3079E+01 | −8.5187E+01 | 2.2444E+02 | −3.8934E+02 | 3.9695E+02 | −1.7720E+02 |
| S3 | 2.0583E−01 | −3.0788E+00 | 1.6129E+01 | −4.3389E+01 | 5.1015E+01 | 2.1749E+01 | −8.4459E+01 | 0.0000E+00 |
| S4 | −3.2738E−02 | −3.8317E−01 | 2.9344E+00 | −1.5112E+01 | 3.5207E+01 | −3.5750E+01 | 1.3074E+01 | 0.0000E+00 |
| S5 | −2.4837E−01 | −3.2793E−01 | −1.7314E+01 | 1.8014E+02 | −1.0616E+03 | 2.5287E+03 | −1.1797E+03 | 0.0000E+00 |
| S6 | −1.1788E−01 | −4.0026E+00 | 4.7526E+01 | −4.4125E+02 | 2.3159E+03 | −6.4052E+03 | 7.1728E+03 | 0.0000E+00 |
| S7 | −6.4832E−01 | −8.9759E−01 | 8.8343E+00 | −5.6375E+01 | 2.0586E+02 | −3.6519E+02 | 1.9762E+02 | 0.0000E+00 |
| S8 | −5.7356E−01 | 9.5273E−01 | −2.0273E+00 | 3.9888E+00 | −4.1207E+00 | 2.4037E+00 | −1.0132E+00 | 0.0000E+00 |
| S9 | −5.1058E−02 | −2.5306E+00 | 1.3110E+01 | −2.7690E+01 | 3.3497E+01 | −2.4107E+01 | 9.4377E+00 | −1.5302E+00 |
| S10 | −1.2072E−01 | −8.1936E−01 | 3.3089E+00 | −1.0232E+01 | 2.5825E+01 | −3.4733E+01 | 2.2397E+01 | −5.5455E+00 |
| S11 | −8.3793E−01 | 4.0617E−01 | 4.6864E−01 | −8.4457E−01 | 5.7545E−01 | −2.0630E−01 | 3.8444E−02 | −2.9427E−03 |
| S12 | −5.8069E−01 | 6.4779E−01 | −5.1912E−01 | 2.8261E−01 | −9.7828E−02 | 1.8178E−02 | −1.1208E−03 | −5.6607E−05 |

Figure 8A:
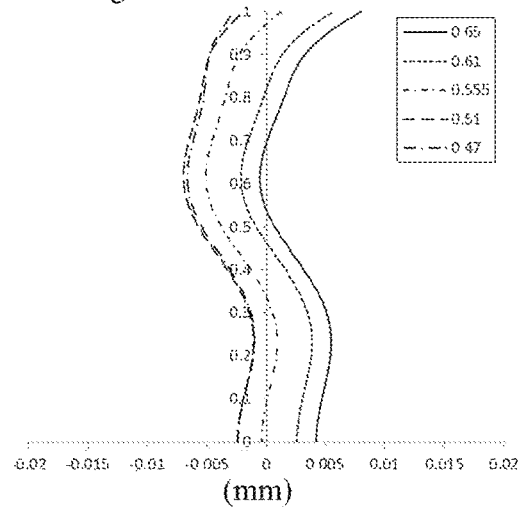
FIG. 8A illustrates a longitudinal aberration curve of the camera lens assembly according to Embodiment 4.
Figure 8B:
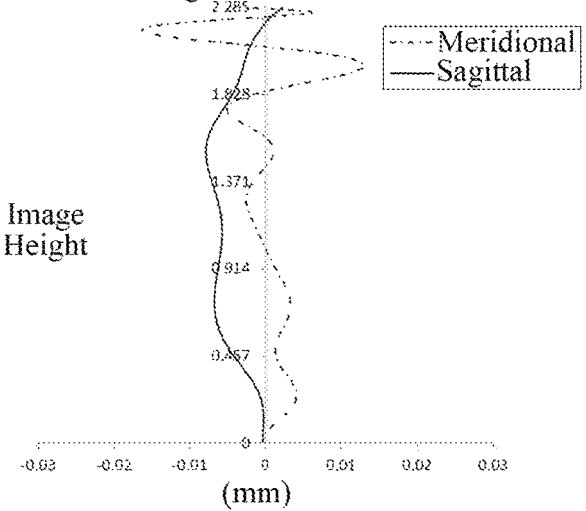
FIG. 8B illustrates an astigmatism curve of the camera lens assembly according to Embodiment 4.
Figure 8C:
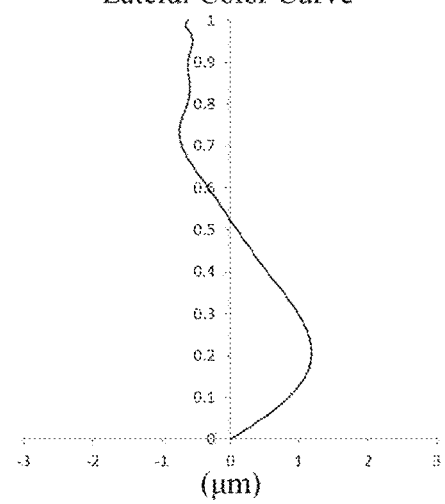
FIG. 8C illustrates a lateral color curve of the camera lens assembly according to Embodiment 4.

FIG. 8A illustrates a longitudinal aberration curve of the camera lens assembly according to Embodiment 4, representing deviations of focal points of light in different wavelengths converged after passing through an optical system. FIG. 8B illustrates an astigmatism curve of the camera lens assembly according to Embodiment 4, representing a curvature of a meridional image plane and a curvature of a sagittal image plane. FIG. 8C illustrates a lateral color curve of the camera lens assembly according to Embodiment 4, representing deviations of different image heights on an image plane after light passes through the camera lens assembly. It can be seen from FIG. 8A to FIG. 8C that the camera lens assembly provided in Embodiment 4 can achieve good image quality.

Embodiment 5

Figure 9:
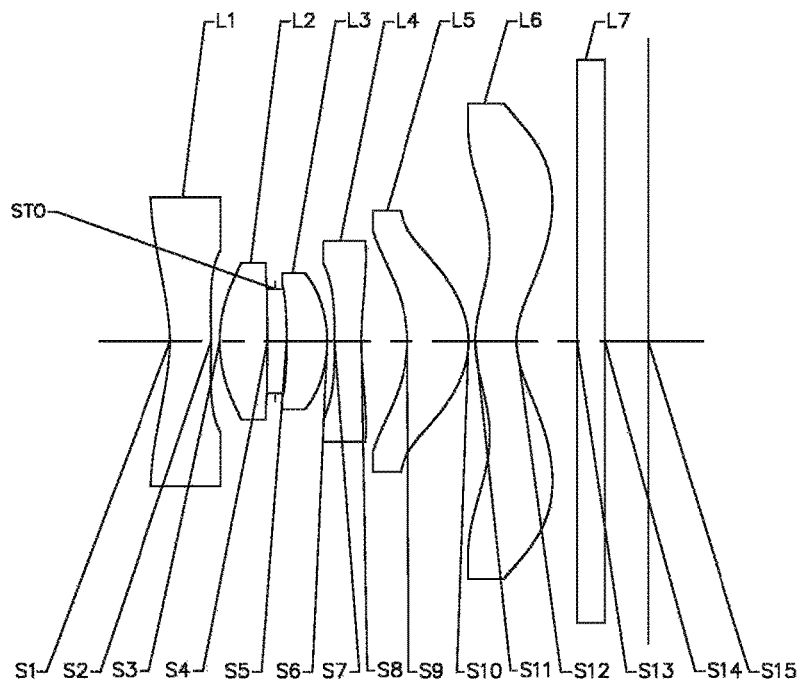
FIG. 9 is a schematic structural diagram of a camera lens assembly according to Embodiment 5 of the present application.

Embodiment 5 according to the above camera lens assembly of the present application will be described below with reference to FIG. 9 to FIG. 10C. FIG. 9 is a schematic structural diagram of a camera lens assembly according to Embodiment 5 of the present application. As shown in FIG. 9, the camera lens assembly according to Embodiment 5 includes a first lens to a sixth lens L1-L6 respectively having an object side surface, and an image side surface.

Table 13 below shows effective focal lengths of the lenses f1 to f6, a total effective focal length of the camera lens assembly f, a total track length of the camera lens TTL and a half of a maximum field-of-view angle HFOV of the camera lens assembly in Embodiment 5.

TABLE 13

| f1 (mm) | −3.57 | f (mm) | 1.88 |
|---|---|---|---|
| f2 (mm) | 2.05 | Fno | 2.53 |
| f3 (mm) | 1.96 | TTL (mm) | 3.62 |
| f4 (mm) | −2.57 | HFOV (°) | 60.008 |
| f5 (mm) | 2.50 | | |
| f6 (mm) | −4.20 | | |

Referring to Table 13, an effective focal length of the third lens L3 f3 and an effective focal length of the fifth lens L5

Table 14 shows a surface form, a radius of curvature, a thickness, a material and a conic constant of each lens in this embodiment. Table 15 shows high-order coefficients $A_4$, $A_6$, $A_8$, $A_{10}$, $A_{12}$, $A_{16}$ and $A_{18}$ applicable to the aspheric surfaces S1-S12 of the aspheric lenses in this embodiment.

TABLE 14

| surface number | surface form | radius of curvature | thickness | material | conic constant |
|---|---|---|---|---|---|
| OBJ | spherical | infinite | infinite | | |
| S1 | aspheric | −1.3320 | 0.3100 | 1.544/56.11 | −13.1601 |
| S2 | aspheric | −4.5659 | 0.0659 | | −79.3509 |
| S3 | aspheric | 1.1206 | 0.3594 | 1.544/56.11 | 0.8667 |
| S4 | aspheric | −573.2212 | 0.0609 | | 95.0000 |
| STO | spherical | infinite | 0.0840 | | |
| S5 | aspheric | −5.2460 | 0.3060 | 1.544/56.11 | 95.0000 |
| S6 | aspheric | −0.9081 | 0.0559 | | −1.1362 |
| S7 | aspheric | −7.0783 | 0.2000 | 1.651/21.52 | −76.1524 |
| S8 | aspheric | 2.2362 | 0.3513 | | −8.2981 |
| S9 | aspheric | −0.9196 | 0.4689 | 1.544/56.11 | −3.1029 |
| S10 | aspheric | −0.6482 | 0.0500 | | −1.6506 |
| S11 | aspheric | 0.8994 | 0.3096 | 1.535/55.8 | −2.0085 |
| S12 | aspheric | 0.5656 | 0.4596 | | −2.7664 |
| S13 | spherical | infinite | 0.2100 | 1.517/64.17 | |
| S14 | spherical | infinite | 0.3263 | | |
| S15 | spherical | infinite | | | |

Referring to Table 14 and Table 15, a center thickness of the second lens L2 on the optical axis CT2 and a center thickness of the third lens L3 on the optical axis CT3 satisfy CT2/CT3=1.175. A radius of curvature of the object side surface S9 of the fifth lens R9 and a radius of curvature of the image side surface S10 of the fifth lens R10 satisfy R9/R10=1.419.

TABLE 15

| surface number | A4 | A6 | A8 | A10 | A12 | A14 | A16 | A18 |
|---|---|---|---|---|---|---|---|---|
| S1 | 1.4446E−01 | −2.7375E−01 | 3.8131E−01 | −2.8063E−01 | 1.0202E−01 | −1.4280E−02 | −9.8016E−04 | 3.7629E−04 |
| S2 | 1.2772E+00 | −7.2933E+00 | 3.7565E+01 | −1.4661E+02 | 4.1415E+02 | −7.6701E+02 | 8.3141E+02 | −3.9553E+02 |
| S3 | 5.4397E−01 | −6.2323E+00 | 3.3288E+01 | −1.2776E+02 | 3.0662E+02 | −3.8593E+02 | 1.4634E+02 | 0.0000E+00 |
| S4 | −3.7371E−02 | −7.8287E−01 | 2.2179E+00 | −1.9066E+01 | 1.0737E+02 | −3.2918E+02 | 3.8380E+02 | 0.0000E+00 |
| S5 | −1.0157E−01 | −1.7442E+00 | 6.4589E+00 | −3.5854E+01 | 7.3618E+01 | −1.8894E+02 | 8.0331E+02 | 0.0000E+00 |
| S6 | 2.0628E−01 | −4.6103E+00 | 2.3336E+01 | −8.7815E+01 | 2.4828E+02 | −5.9341E+02 | 7.1894E+02 | 0.0000E+00 |
| S7 | −3.1623E−01 | −2.8219E+00 | 1.1888E+01 | −1.7602E+00 | −1.2125E+02 | 3.5022E+02 | −3.4359E+02 | 0.0000E+00 |
| S8 | −3.7850E−01 | 1.3041E−01 | 7.6228E−01 | −6.0372E−01 | −2.9320E+00 | 5.6050E+00 | −2.7347E+00 | 0.0000E+00 |
| S9 | 2.4633E−01 | −2.3997E+00 | 8.3336E+00 | −1.3936E+01 | 1.3256E+01 | −7.4588E+00 | 2.3307E+00 | −3.1293E−01 |
| S10 | −5.6255E−02 | −8.4078E−01 | 3.1941E+00 | −9.4029E+00 | 2.0374E+01 | −2.3123E+01 | 1.2482E+01 | −2.5568E+00 |
| S11 | −7.8359E−01 | 5.1492E−01 | 6.8897E−02 | −3.6328E−01 | 2.7461E−01 | −1.0112E−01 | 1.8854E−02 | −1.4222E−03 |
| S12 | −5.2686E−01 | 6.0657E−01 | −5.1952E−01 | 3.1174E−01 | −1.2582E−01 | 3.1461E−02 | −4.3069E−03 | 2.4440E−04 |

In this embodiment, an axial distance from the object side surface of the first lens L1 to the image plane along the optical axis TTL and ImgH, ImgH being half a diagonal length of an effective pixel area of the electronic photosensitive element, satisfy TTL/ImgH=1.583. An axial spacing distance between the third lens L3 and the fourth lens L4 T34 and an axial spacing distance between the fifth lens L5 and the sixth lens L6 T56 satisfy T34/T56=1.118. An axial distance between an intersection point of the object side surface of the fifth lens and the optical axis and a vertex of an effective radius of the object side surface of the fifth lens SAG51 and the axial distance from the object side surface of the first lens to the image plane TTL satisfy SAG51/TTL=−0.144. An effective radius of the object side surface S1 of the first lens DT11 and an effective radius of the image side surface S10 of the fifth lens DT52 satisfy DT11/DT52=0.608.

Figure 10A:
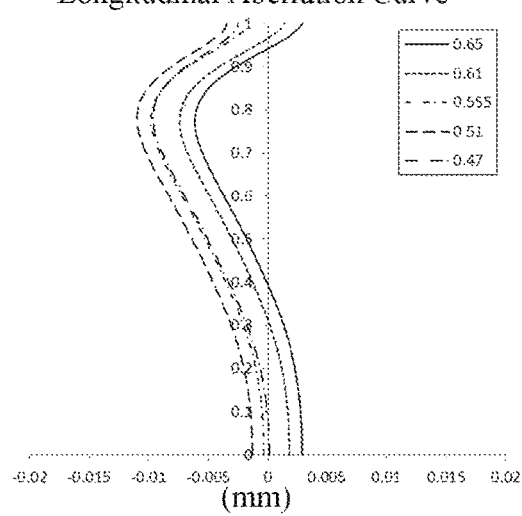
FIG. 10A illustrates a longitudinal aberration curve of the camera lens assembly according to Embodiment 5.
Figure 10B:
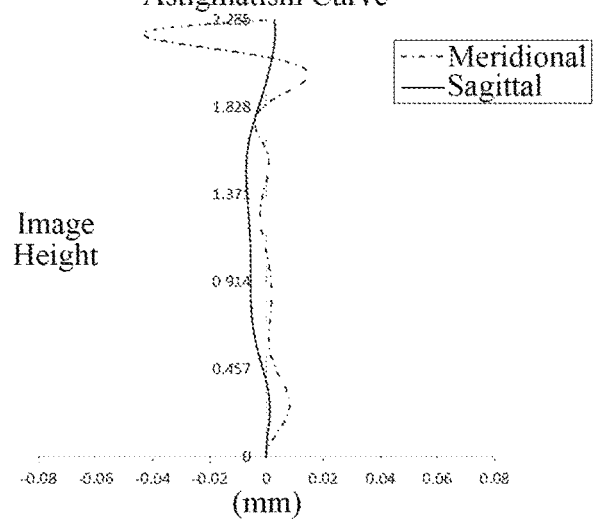
FIG. 10B illustrates an astigmatism curve of the camera lens assembly according to Embodiment 5.
Figure 10C:
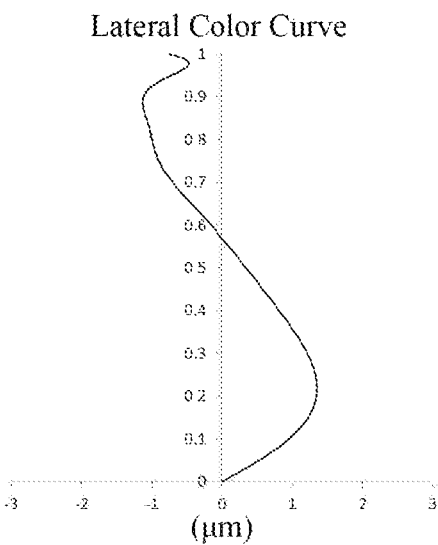
FIG. 10C illustrates a lateral color curve of the camera lens assembly according to Embodiment 5.

FIG. 10A illustrates a longitudinal aberration curve of the camera lens assembly according to Embodiment 5, representing deviations of focal points of light in different wavelengths converged after passing through an optical system. FIG. 10B illustrates an astigmatism curve of the camera lens assembly according to Embodiment 5, representing a curvature of a meridional image plane and a curvature of a sagittal image plane. FIG. 10C illustrates a lateral color curve of the camera lens assembly according to Embodiment 5, representing deviations of different image heights on an image plane after light passes through the camera lens assembly. It can be seen from FIG. 10A to FIG. 10C that the camera lens assembly provided in Embodiment 5 can achieve good image quality.

Embodiment 6

Figure 11:
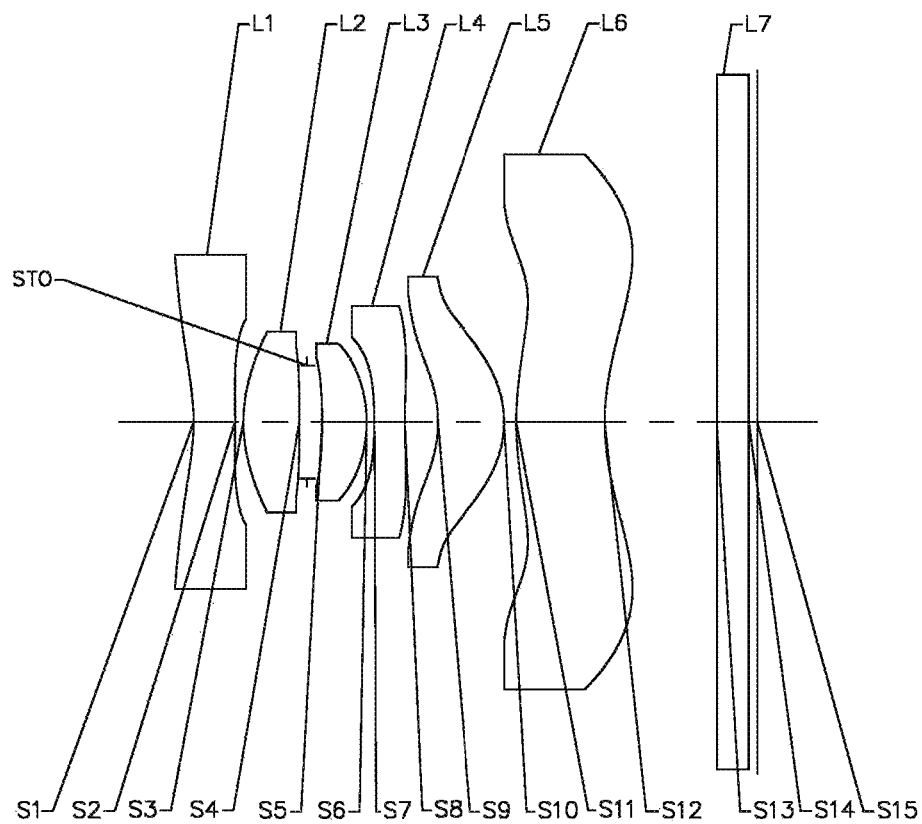
FIG. 11 is a schematic structural diagram of a camera lens assembly according to Embodiment 6 of the present application.

Embodiment 6 according to the above camera lens assembly of the present application will be described below with reference to FIG. 11 to FIG. 12C. FIG. 11 is a schematic structural diagram of a camera lens assembly according to Embodiment 6 of the present application. As shown in FIG. 11, the camera lens assembly according to Embodiment 6 includes a first lens to a sixth lens L1-L6 respectively having an object side surface, and an image side surface.

Table 16 below shows effective focal lengths of the lenses f1 to f6, a total effective focal length of the camera lens assembly f, a total track length of the camera lens TTL and a half of a maximum field-of-view angle HFOV of the camera lens assembly in Embodiment 6.

Referring to Table 16, an effective focal length of the third lens L3 f3 and an effective focal length of the fifth lens L5 f5 may satisfy f3/f5=0.458. An effective focal length of the fourth lens L4 f4 and the total effective focal length of the camera lens assembly f may satisfy f4/f=−1.336. The half of the maximum field-of-view angle HFOV of the camera lens assembly may be set to HFOV=60.002°.

TABLE 16

| f1 (mm) | −3.37 | f (mm) | 1.80 |
|---|---|---|---|
| f2 (mm) | 1.96 | Fno | 2.52 |
| f3 (mm) | 1.99 | TTP (mm) | 3.70 |
| f4 (mm) | −2.40 | HFOV (°) | 60.002 |
| f5 (mm) | 4.34 | | |
| f6 (mm) | 26.24 | | |

Table 17 shows a surface form, a radius of curvature, a thickness, a material and a conic constant of each lens in this embodiment. Table 18 shows high-order coefficients $A_4$, $A_6$, $A_8$, $A_{10}$, $A_{12}$, $A_{16}$ and $A_{18}$ applicable to the aspheric surfaces S1-S12 of the aspheric lenses in this embodiment.

TABLE 17

| surface number | surface form | radius of curvature | thickness | material | conic constant |
|---|---|---|---|---|---|
| OBJ | spherical | infinite | infinite | | |
| S1 | aspheric | −1.4051 | 0.2716 | 1.544/56.11 | −15.7572 |
| S2 | aspheric | −6.3340 | 0.0553 | | −22.9241 |
| S3 | aspheric | 1.1024 | 0.3662 | 1.544/56.11 | −0.5510 |
| S4 | aspheric | −29.7965 | 0.0500 | | 95.0000 |
| STO | spherical | infinite | 0.0996 | | |
| S5 | aspheric | −3.6304 | 0.2924 | 1.544/56.11 | 9.2005 |
| S6 | aspheric | −0.8601 | 0.0501 | | −1.0143 |
| S7 | aspheric | −2.7738 | 0.2000 | 1.651/21.52 | 20.8479 |
| S8 | aspheric | 3.7507 | 0.2173 | | −17.8073 |
| S9 | aspheric | −0.8788 | 0.4370 | 1.544/56.11 | −4.3498 |
| S10 | aspheric | −0.7538 | 0.0792 | | −1.8033 |
| S11 | aspheric | 1.5299 | 0.5810 | 1.535/55.8 | −78.5572 |
| S12 | aspheric | 1.4887 | 0.7352 | | −9.5931 |
| S13 | spherical | infinite | 0.2100 | 1.517/64.17 | |
| S14 | spherical | infinite | 0.0550 | | |
| S15 | spherical | infinite | | | |

Referring to Table 17 and Table 18, a center thickness of the second lens L2 on the optical axis CT2 and a center thickness of the third lens L3 on the optical axis CT3 satisfy CT2/CT3=1.252. A radius of curvature of the object side surface S9 of the fifth lens R9 and a radius of curvature of the image side surface S10 of the fifth lens R10 satisfy R9/R10=1.166.

TABLE 18

| Surface number | A4 | A6 | A8 | A10 | A12 | A14 | A16 | A18 |
|---|---|---|---|---|---|---|---|---|
| S1 | 2.7891E−01 | −8.0376E−01 | 1.7780E+00 | −2.6596E+00 | 2.5347E+00 | −1.4605E+00 | 4.5890E−01 | −5.9568E−02 |
| S2 | 1.3901E+00 | −8.6478E+00 | 4.1855E+01 | −1.2963E+02 | 2.6031E+02 | −3.3730E+02 | 2.8480E+02 | −1.2650E+02 |
| S3 | 6.8810E−01 | −1.1494E+01 | 8.4051E+01 | −3.6598E+02 | 9.3396E+02 | −1.2429E+03 | 6.3241E+02 | 0.0000E+00 |
| S4 | −3.8614E−01 | 1.6842E+00 | −1.7355E+01 | 1.2251E+02 | −4.7142E+02 | 8.8117E+02 | −6.2602E+02 | 0.0000E+00 |
| S5 | −2.0767E−01 | −1.9275E+00 | 1.3033E+01 | −1.1945E+02 | 6.4463E+02 | −1.4879E+03 | 1.2110E+03 | 0.0000E+00 |
| S6 | −2.4152E−01 | 9.7001E−01 | 1.2800E+01 | −3.8390E+02 | 2.5694E+03 | −7.2703E+03 | 7.5841E+03 | 0.0000E+00 |
| S7 | −6.3755E−01 | −1.4198E+00 | 4.0416E+01 | −4.3036E+02 | 1.9733E+03 | −4.0638E+03 | 3.0841E+03 | 0.0000E+00 |
| S8 | −8.4411E−01 | 4.0464E+00 | −1.7509E+01 | 4.6854E+01 | −7.5261E+01 | 6.7590E+01 | −2.5786E+01 | 0.0000E+00 |
| S9 | −1.0446E+00 | 6.6849E+00 | −1.7199E+01 | 2.7978E+01 | −3.1377E+01 | 2.2992E+01 | −9.6265E+00 | 1.7130E+00 |
| S10 | −1.3404E+00 | 6.1854E+00 | −1.4957E+01 | 1.4084E+01 | 1.2864E+01 | −3.8062E+01 | 2.8505E+01 | −7.2096E+00 |
| S11 | 1.8317E−01 | −1.9622E−01 | −3.9038E−01 | 6.0261E−01 | −3.2428E−01 | 8.4547E−02 | −1.0791E−02 | 5.4047E−04 |
| S12 | 8.1022E−03 | −6.1766E−03 | −9.1068E−02 | 8.8374E−02 | −3.9354E−02 | 9.4214E−03 | −1.1580E−03 | 5.7188E−05 |

In this embodiment, an axial distance from the object side surface of the first lens L1 to the image plane along the optical axis TTL and ImgH, ImgH being half a diagonal length of an effective pixel area of the electronic photosensitive element, satisfy TTL/ImgH=1.619. An axial spacing distance between the third lens L3 and the fourth lens L4 T34 and an axial spacing distance between the fifth lens L5 and the sixth lens L6 T56 satisfy T34/T56=0.633. An axial distance between an intersection point of the object side surface of the fifth lens and the optical axis and a vertex of an effective radius of the object side surface of the fifth lens SAG51 and the axial distance from the object side surface of the first lens to the image plane TTL satisfy SAG51/TTL=−0.119. An effective radius of the object side surface S1 of the first lens DT11 and an effective radius of the image side surface S10 of the fifth lens DT52 satisfy DT11/DT52=1.150.

Figure 12A:
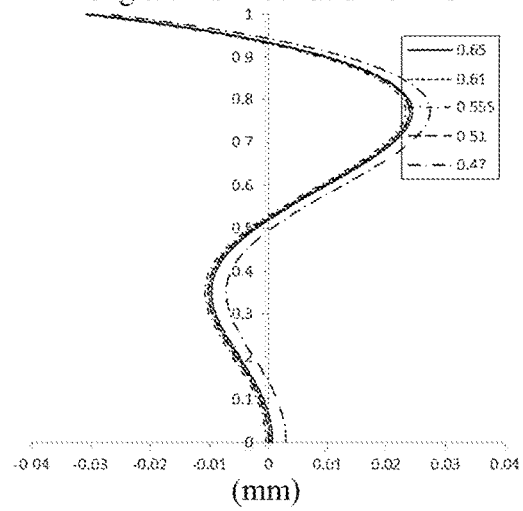
FIG. 12A illustrates a longitudinal aberration curve of the camera lens assembly according to Embodiment 6.
Figure 12B:
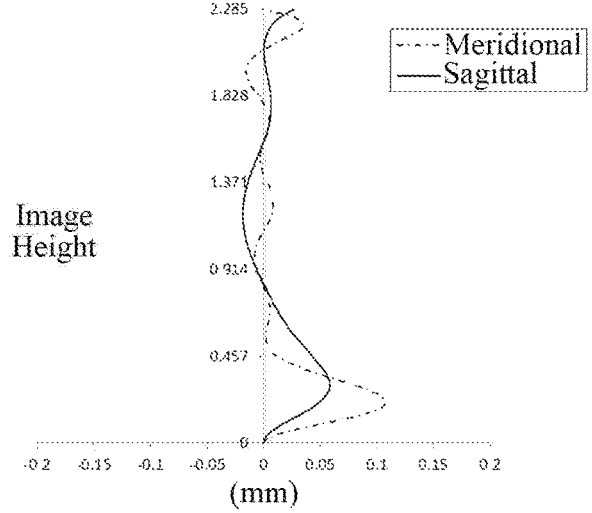
FIG. 12B illustrates an astigmatism curve of the camera lens assembly according to Embodiment 6.
Figure 12C:
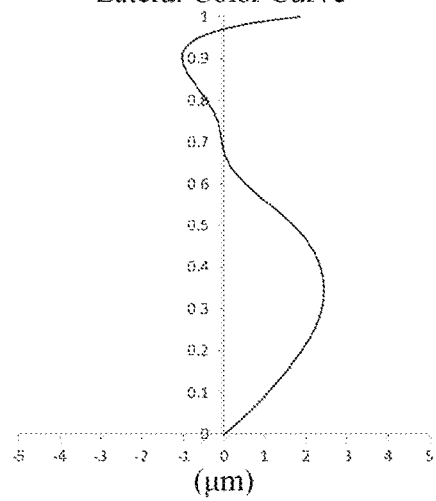
FIG. 12C illustrates a lateral color curve of the camera lens assembly according to Embodiment 6.

FIG. 12A illustrates a longitudinal aberration curve of the camera lens assembly according to Embodiment 6, representing deviations of focal points of light in different wavelengths converged after passing through an optical system. FIG. 12B illustrates an astigmatism curve of the camera lens assembly according to Embodiment 6, representing a curvature of a meridional image plane and a curvature of a sagittal image plane. FIG. 12C illustrates a lateral color curve of the camera lens assembly according to Embodiment 6, representing deviations of different image heights on an image plane after light passes through the camera lens assembly. It can be seen from FIG. 12A to FIG. 12C that the camera lens assembly provided in Embodiment 6 can achieve good image quality.

Embodiment 7

Figure 13:
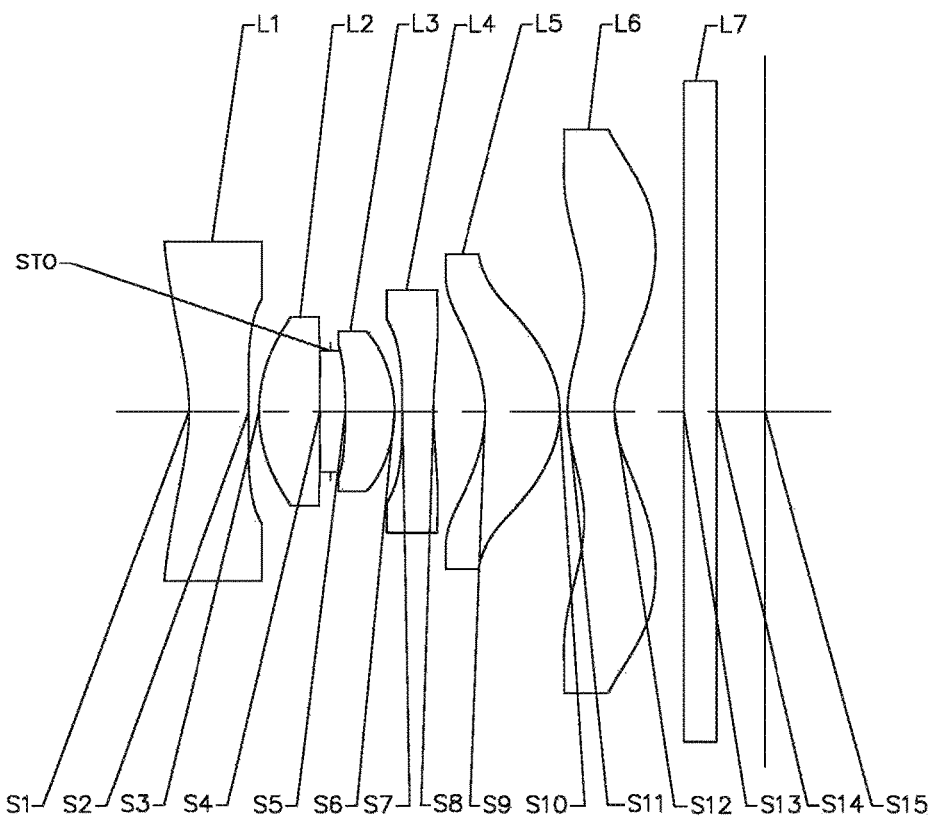
FIG. 13 is a schematic structural diagram of a camera lens assembly according to Embodiment 7 of the present application.

Embodiment 7 according to the above camera lens assembly of the present application will be described below with reference to FIG. 13 to FIG. 14C. FIG. 13 is a schematic structural diagram of a camera lens assembly according to Embodiment 7 of the present application. As shown in FIG. 13, the camera lens assembly according to Embodiment 7 includes a first lens to a sixth lens L1-L6 respectively having an object side surface, and an image side surface.

Table 19 below shows effective focal lengths of the lenses f1 to f6, a total effective focal length of the camera lens assembly f, a total track length of the camera lens TTL and a half of a maximum field-of-view angle HFOV of the camera lens assembly in Embodiment 7.

TABLE 19

| f1 (mm) | −3.46 | f (mm) | 1.88 |
|---|---|---|---|
| f2 (mm) | 1.89 | Fno | 2.54 |

TABLE 19-continued

| f3 (mm) | 1.97 | TTL (mm) | 3.70 |
|---|---|---|---|
| f4 (mm) | −2.58 | HFOV (°) | 60.002 |
| f5 (mm) | 2.76 | | |
| f6 (mm) | −4.49 | | |

Referring to Table 19, an effective focal length of the third lens L3 f3 and an effective focal length of the fifth lens L5 f5 may satisfy f3/f5=0.713. An effective focal length of the fourth lens L4 f4 and the total effective focal length of the camera lens assembly f may satisfy f4/f=−1.369. The half of the maximum field-of-view angle HFOV of the camera lens assembly may be set to HFOV=60.002°.

Table 20 shows a surface form, a radius of curvature, a thickness, a material and a conic constant of each lens in this embodiment. Table 21 shows high-order coefficients $A_4$, $A_6$, $A_8$, $A_{10}$, $A_{12}$, $A_{16}$ and $A_{18}$ applicable to the aspheric surfaces S1-S12 of the aspheric lenses in this embodiment.

TABLE 20

| surface number | surface form | radius of curvature | thickness | material | conic constant |
|---|---|---|---|---|---|
| OBJ | spherical | infinite | infinite | | |
| S1 | aspheric | −1.4054 | 0.3861 | 1.544/56.11 | −11.3154 |
| S2 | aspheric | −6.0348 | 0.0651 | | −12.5751 |
| S3 | aspheric | 1.0075 | 0.3900 | 1.544/56.11 | 0.5777 |
| S4 | aspheric | 36.3309 | 0.0661 | | −95.0000 |
| STO | spherical | infinite | 0.0962 | | |
| S5 | aspheric | −3.6848 | 0.3145 | 1.544/56.11 | −75.4084 |
| S6 | aspheric | −0.8573 | 0.0500 | | −1.5296 |
| S7 | aspheric | −6.0554 | 0.2000 | 1.651/21.52 | −51.2037 |
| S8 | aspheric | 2.3802 | 0.3337 | | −2.3885 |
| S9 | aspheric | −0.8919 | 0.4804 | 1.544/56.11 | −3.5861 |
| S10 | aspheric | −0.6669 | 0.0500 | | −1.6200 |
| S11 | aspheric | 0.8884 | 0.3000 | 1.535/55.8 | −1.8910 |
| S12 | aspheric | 0.5727 | 0.4434 | | −2.9244 |
| S13 | spherical | infinite | 0.2100 | 1.517/64.17 | |
| S14 | spherical | infinite | 0.3101 | | |
| S15 | spherical | infinite | | | |

Referring to Table 20 and Table 21, a center thickness of the second lens L2 on the optical axis CT2 and a center thickness of the third lens L3 on the optical axis CT3 satisfy CT2/CT3=1.240. A radius of curvature of the object side surface S9 of the fifth lens R9 and a radius of curvature of the image side surface S10 of the fifth lens R10 satisfy R9/R10=1.337.

TABLE 21

| surface number | A4 | A6 | A8 | A10 | A12 | A14 | A16 | A18 |
|---|---|---|---|---|---|---|---|---|
| S1 | 1.4012E−01 | −2.5794E−01 | 3.8870E−01 | −3.8549E−01 | 2.3624E−01 | −7.1142E−02 | −2.9631E−04 | 3.8721E−03 |
| S2 | 1.1145E+00 | −5.5487E+00 | 2.6038E+01 | −9.0905E+01 | 2.2943E+02 | −3.8627E+02 | 3.8770E+02 | −1.7359E+02 |
| S3 | 4.6418E−01 | −4.7150E+00 | 2.1303E+01 | −5.5588E+01 | 4.8918E+01 | 9.1011E+01 | −1.9732E+02 | 0.0000E+00 |
| S4 | −4.4373E−02 | −4.3674E−01 | 2.7998E+00 | −2.8289E+01 | 1.4183E+02 | −3.7990E+02 | 3.9447E+02 | 0.0000E+00 |
| S5 | −5.0376E−01 | −6.4698E−01 | −7.9298E+00 | 7.9685E+00 | −4.5336E+02 | 6.1669E+02 | 1.1783E+03 | 0.0000E+00 |
| S6 | −4.4936E−02 | −3.2712E+00 | 2.3232E+01 | −1.8214E+02 | 9.5816E+02 | −2.7934E+03 | 3.2977E+03 | 0.0000E+00 |
| S7 | −5.4553E−01 | −6.2975E−01 | 1.4931E+00 | 7.0305E+00 | −3.3954E+01 | 4.4797E+01 | −2.9208E+01 | 0.0000E+00 |
| S8 | −6.1514E−01 | 1.3735E+00 | −4.5316E+00 | 1.3125E+01 | −2.4149E+01 | 2.5160E+01 | −1.0988E+01 | 0.0000E+00 |
| S9 | 6.8351E−02 | −2.8776E+00 | 1.3714E+01 | −3.1667E+01 | 4.4693E+01 | −3.7711E+01 | 1.7027E+01 | −3.1334E+00 |
| S10 | −5.4466E−02 | −1.3016E+00 | 5.7316E+00 | −1.6695E+01 | 3.3786E+01 | −3.8292E+01 | 2.1773E+01 | −4.8777E+00 |
| S11 | −8.6643E−01 | 6.7868E−01 | −1.4097E−01 | −1.7468E−01 | 1.6877E−01 | −6.6835E−02 | 1.3074E−02 | −1.0381E−03 |
| S12 | −4.7558E−01 | 4.7598E−01 | −3.4029E−01 | 1.5979E−01 | −4.5153E−02 | 5.6605E−03 | 2.4621E−04 | −9.6221E−05 |

In this embodiment, an axial distance from the object side surface of the first lens L1 to the image plane along the optical axis TTL and ImgH, ImgH being half a diagonal length of an effective pixel area of the electronic photosensitive element, satisfy TTL/ImgH=1.617. An axial spacing distance between the third lens L3 and the fourth lens L4 T34 and an axial spacing distance between the fifth lens L5 and the sixth lens L6 T56 satisfy T34/T56=1. An axial distance between an intersection point of the object side surface of the fifth lens and the optical axis and a vertex of an effective radius of the object side surface of the fifth lens SAG51 and the axial distance from the object side surface of the first lens to the image plane TTL satisfy SAG51/TTL=−0.141. An effective radius of the object side surface S1 of the first lens DT11 and an effective radius of the image side surface S10 of the fifth lens DT52 satisfy DT11/DT52=1.076.

Figure 14A:
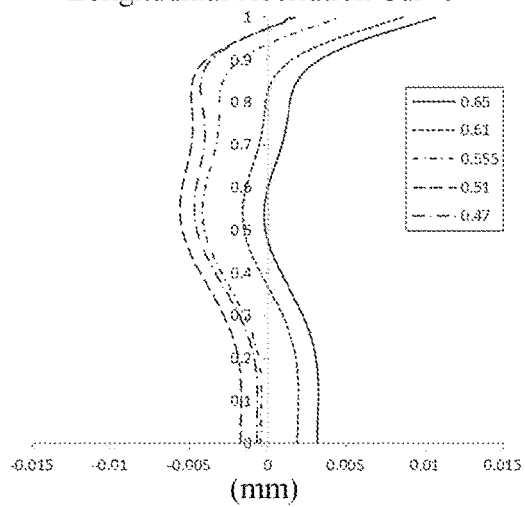
FIG. 14A illustrates a longitudinal aberration curve of the camera lens assembly according to Embodiment 7.
Figure 14B:
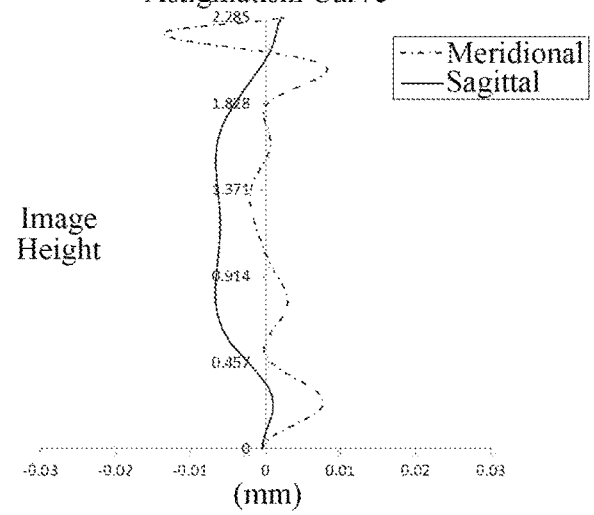
FIG. 14B illustrates an astigmatism curve of the camera lens assembly according to Embodiment 7.
Figure 14C:
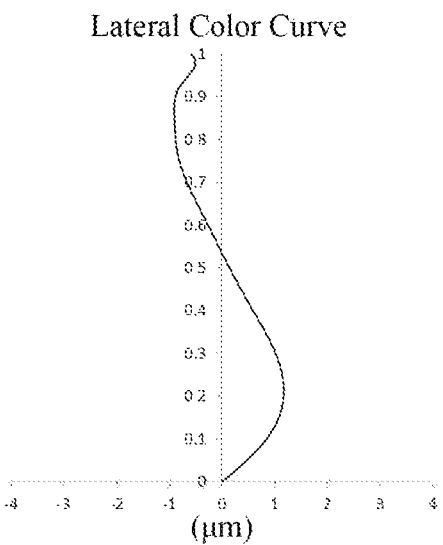
FIG. 14C illustrates a lateral color curve of the camera lens assembly according to Embodiment 7.

FIG. 14A illustrates a longitudinal aberration curve of the camera lens assembly according to Embodiment 7, representing deviations of focal points of light in different wavelengths converged after passing through an optical system. FIG. 14B illustrates an astigmatism curve of the camera lens assembly according to Embodiment 7, representing a curvature of a meridional image plane and a curvature of a sagittal image plane. FIG. 14C illustrates a lateral color curve of the camera lens assembly according to Embodiment 7, representing deviations of different image heights on an image plane after light passes through the camera lens assembly. It can be seen from FIG. 14A to FIG. 14C that the camera lens assembly provided in Embodiment 7 can achieve good image quality.

Embodiment 8

Figure 15:
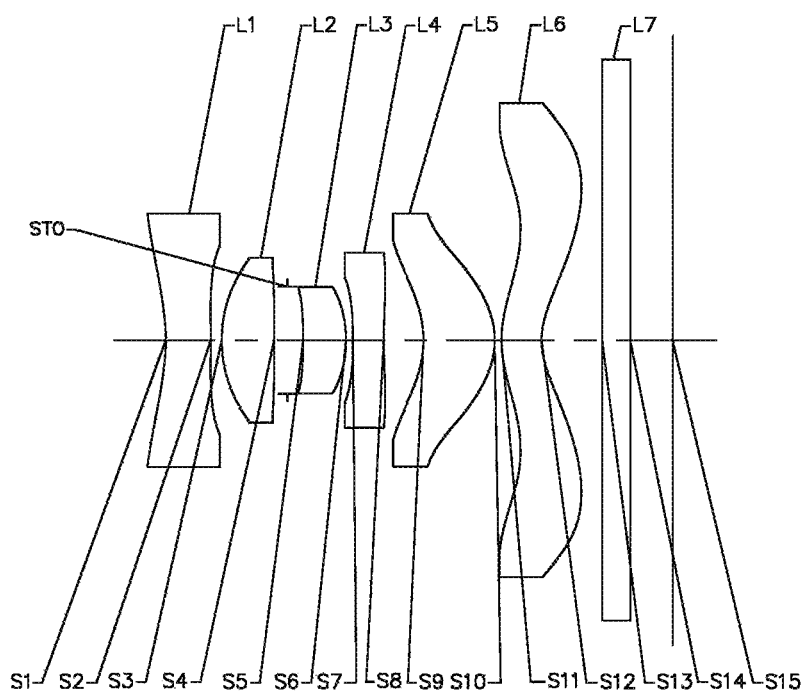
FIG. 15 is a schematic structural diagram of a camera lens assembly according to Embodiment 8 of the present application.

Embodiment 8 according to the above camera lens assembly of the present application will be described below with reference to FIG. 15 to FIG. 16C. FIG. 15 is a schematic structural diagram of a camera lens assembly according to Embodiment 8 of the present application. As shown in FIG. 15, the camera lens assembly according to Embodiment 8 includes a first lens to a sixth lens L1-L6 respectively having an object side surface, and an image side surface.

Table 22 below shows effective focal lengths of the lenses f1 to f6, a total effective focal length of the camera lens assembly f, a total track length of the camera lens TTL and a half of a maximum field-of-view angle HFOV of the camera lens assembly in Embodiment 8.

TABLE 22

| f1 (mm) | −3.69 | f (mm) | 1.86 |
|---|---|---|---|
| f2 (mm) | 1.95 | Fno | 2.38 |
| f3 (mm) | 2.14 | TTL (mm) | 3.79 |
| f4 (mm) | −2.93 | HFOV (°) | 59.993 |
| f5 (mm) | 2.35 | | |
| f6 (mm) | −4.26 | | |

Referring to Table 22, an effective focal length of the third lens L3 f3 and an effective focal length of the fifth lens L5 f5 may satisfy f3/f5=0.915. An effective focal length of the fourth lens L4 f4 and the total effective focal length of the camera lens assembly f may satisfy f4/f=−1.573. The half of the maximum field-of-view angle HFOV of the camera lens assembly may be set to HFOV=59.993°.

Table 23 shows a surface form, a radius of curvature, a thickness, a material and a conic constant of each lens in this embodiment.

TABLE 23

| surface number | surface form | radius of curvature | thickness | material | conic constant |
|---|---|---|---|---|---|
| OBJ | spherical | infinite | infinite | | |
| S1 | aspheric | −1.3718 | 0.3353 | APL5514 | −12.6458 |
| S2 | aspheric | −4.6743 | 0.0821 | | −72.9675 |
| S3 | aspheric | 1.0832 | 0.3917 | APL5514 | 0.6682 |
| S4 | aspheric | −52.9416 | 0.0999 | | −95.0000 |
| STO | spherical | infinite | 0.1179 | | |
| S5 | aspheric | −3.4920 | 0.3200 | APL5514 | 46.3021 |
| S6 | aspheric | −0.9052 | 0.0500 | | −1.3887 |
| S7 | aspheric | −5.1987 | 0.2306 | EP7000 | 38.7957 |
| S8 | aspheric | 3.0996 | 0.3027 | | 0.0561 |
| S9 | aspheric | −0.7731 | 0.5325 | APL5514 | −3.4263 |
| S10 | aspheric | −0.5993 | 0.0500 | | −1.8249 |
| S11 | aspheric | 0.8685 | 0.2996 | K26R | −2.1503 |
| S12 | aspheric | 0.5537 | 0.4533 | | −3.5285 |
| S13 | spherical | infinite | 0.2100 | BK7 | |
| S14 | spherical | infinite | 0.3165 | | |
| S15 | spherical | infinite | | | |

Referring to Table 23 and Table 24, a center thickness of the second lens L2 on the optical axis CT2 and a center thickness of the third lens L3 on the optical axis CT3 satisfy CT2/CT3=1.224. A radius of curvature of the object side surface S9 of the fifth lens R9 and a radius of curvature of the image side surface S10 of the fifth lens R10 satisfy R9/R10=1.290.

In this embodiment, an axial distance from the object side surface of the first lens L1 to the image plane along the optical axis TTL and ImgH, ImgH being half a diagonal length of an effective pixel area of the electronic photosensitive element, satisfy TTL/ImgH=1.660. An axial spacing distance between the third lens L3 and the fourth lens L4

T34 and an axial spacing distance between the fifth lens L5 and the sixth lens L6 T56 satisfy T34/T56=1. An axial distance between an intersection point of the object side surface of the fifth lens and the optical axis and a vertex of an effective radius of the object side surface of the fifth lens SAG51 and the axial distance from the object side surface of the first lens to the image plane TTL satisfy SAG51/TTL=−0.132. An effective radius of the object side surface S1 of the first lens DT11 and an effective radius of the image side surface S10 of the fifth lens DT52 satisfy DT11/DT52=1.001.

Table 24 shows high-order coefficients $A_4$, $A_6$, $A_8$, $A_{10}$, $A_{12}$, $A_{16}$ and $A_{18}$ applicable to the aspheric surfaces S1-S12 of the aspheric lenses in this embodiment.

digital camera, or may be a camera module integrated in a mobile electronic device such as a mobile phone. The camera device is equipped with the camera lens assembly described in the above embodiments.

Exemplary embodiments of the present application are described above with reference to the accompanying drawings. It should be appreciated by those skilled in the art that the above exemplary embodiments are merely examples taken for the purpose of description, rather than the limitation to the scope of the present application. Any modification and equivalent substitution, etc. made within the teachings of the present application and the scope of protection of the claims shall be included within the scope of protection of the present application.

TABLE 24

| surface number | A4 | A6 | A8 | A10 | A12 | A14 | A16 | A18 |
|---|---|---|---|---|---|---|---|---|
| S1 | 2.4959E−01 | −7.3884E−01 | 1.5209E+00 | −2.2518E+00 | 2.3956E+00 | −1.7059E+00 | 7.1428E−01 | −1.3113E−01 |
| S2 | 1.4250E+00 | −7.8587E+00 | 3.5120E+01 | −1.1570E+02 | 2.6907E+02 | −4.0410E+02 | 3.4799E+02 | −1.2941E+02 |
| S3 | 7.1558E−01 | −6.7163E+00 | 3.5335E+01 | −1.2728E+02 | 2.9606E+02 | −3.7868E+02 | 1.7594E+02 | 0.0000E+00 |
| S4 | −2.4215E−02 | −1.3819E−01 | −1.8231E+00 | 2.0288E+01 | −8.6393E+01 | 1.1316E+02 | −2.8990E+00 | 0.0000E+00 |
| S5 | −2.5582E−01 | 3.6547E−01 | −3.2642E+01 | 4.5086E+02 | −3.7482E+03 | 1.6184E+04 | −2.8849E+04 | 0.0000E+00 |
| S6 | −7.3036E−01 | 3.9338E+00 | −2.9944E+01 | 9.6126E+01 | −6.1460E+01 | −7.4797E+02 | 1.7609E+03 | 0.0000E+00 |
| S7 | −1.1779E+00 | 5.4463E+00 | −3.1498E+01 | 1.2605E+02 | −3.5571E+02 | 6.3171E+02 | −5.0433E+02 | 0.0000E+00 |
| S8 | −7.1213E−01 | 1.7165E+00 | −3.7575E+00 | 4.3578E+00 | −1.8032E+00 | 1.4672E+00 | −1.9556E+00 | 0.0000E+00 |
| S9 | −8.6161E−03 | −1.4199E+00 | 7.6147E+00 | −8.7379E+00 | −1.6853E+01 | 5.4953E+01 | −5.3654E+01 | 1.8322E+01 |
| S10 | −8.5215E−02 | −7.9044E−01 | 3.3533E+00 | −8.0687E+00 | 1.5488E+01 | −1.7596E+01 | 9.8969E+00 | −2.1219E+00 |
| S11 | −7.2111E−01 | 7.9416E−01 | −6.1503E−01 | 2.7949E−01 | −5.1307E−02 | −6.5225E−03 | 3.9919E−03 | −4.3740E−04 |
| S12 | −3.4797E−01 | 3.7060E−01 | −2.8663E−01 | 1.4436E−01 | −4.6164E−02 | 8.2714E−03 | −6.0590E−04 | −2.2619E−06 |

Figure 16A:
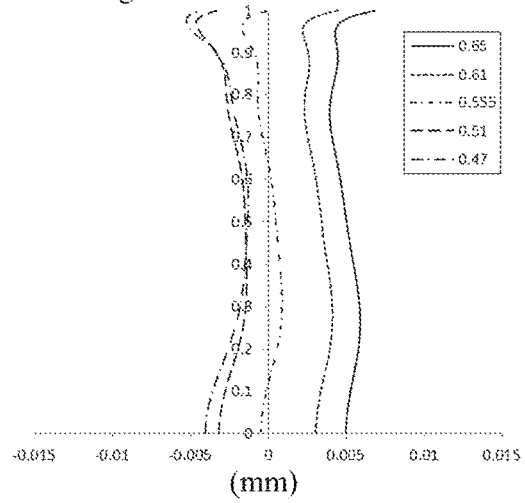
FIG. 16A illustrates a longitudinal aberration curve of the camera lens assembly according to Embodiment 8.
Figure 16B:
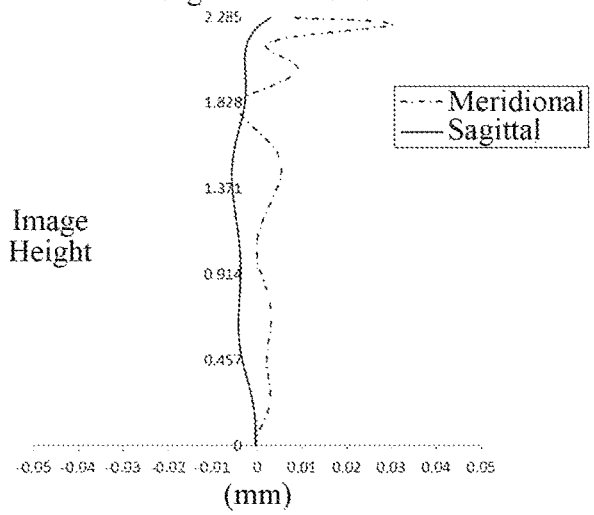
FIG. 16B illustrates an astigmatism curve of the camera lens assembly according to Embodiment 8.
Figure 16C:
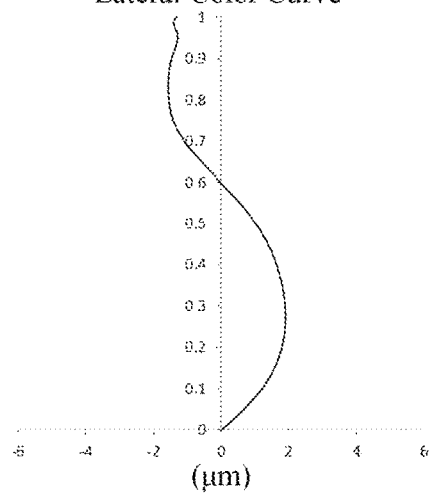
FIG. 16C illustrates a lateral color curve of the camera lens assembly according to Embodiment 8.

FIG. 16A illustrates a longitudinal aberration curve of the camera lens assembly according to Embodiment 8, representing deviations of focal points of light in different wavelengths converged after passing through an optical system. FIG. 16B illustrates an astigmatism curve of the camera lens assembly according to Embodiment 8, representing a curvature of a meridional image plane and a curvature of a sagittal image plane. FIG. 16C illustrates a lateral color curve of the camera lens assembly according to Embodiment 8, representing deviations of different image heights on an image plane after light passes through the camera lens assembly. It can be seen from FIG. 16A to FIG. 16C that the camera lens assembly provided in Embodiment 8 can achieve good image quality.

In view of the above, Embodiment 1 to Embodiment 8 respectively satisfy the relations shown in Table 25 below.

TABLE 25

| | Embodiment | | | | | | | |
|---|---|---|---|---|---|---|---|---|
| Condition | 1 | 2 | 3 | 4 | 5 | 6 | 7 | 8 |
| HFOV (°) | 60.003 | 59.884 | 59.889 | 60.005 | 60.008 | 60.002 | 60.002 | 59.993 |
| f4/f | −1.558 | −1.457 | −1.408 | −1.437 | −1.363 | −1.336 | −1.369 | −1.573 |
| TTL/ImgH | 1.615 | 1.601 | 1.599 | 1.596 | 1.583 | 1.619 | 1.617 | 1.660 |
| f3/f5 | 0.799 | 0.679 | 0.702 | 0.709 | 0.786 | 0.458 | 0.713 | 0.915 |
| SAG51/TTL | −0.137 | −0.140 | −0.142 | −0.142 | −0.144 | −0.119 | −0.141 | −0.132 |
| R9/R10 | 1.370 | 1.255 | 1.259 | 1.254 | 1.419 | 1.166 | 1.337 | 1.290 |
| CT2/CT3 | 1.028 | 1.317 | 1.400 | 1.424 | 1.175 | 1.252 | 1.240 | 1.224 |
| T34/T56 | 1.000 | 1.000 | 1.000 | 1.000 | 1.118 | 0.633 | 1.000 | 1.000 |
| DT11/DT52 | 1.058 | 1.082 | 1.069 | 1.057 | 0.608 | 1.150 | 1.076 | 1.001 |

The present application further provides a camera device, having a photosensitive element which may be a photosensitive charge-coupled device (CCD) or complementary metal-oxide semiconductor (CMOS) element. The camera device may be an independent camera device such as a

What is claimed is:

1. A camera lens assembly, comprising sequentially, from an object side to an image side along an optical axis, a first lens, a second lens, a third lens, a fourth lens, a fifth lens and a sixth lens, and a photosensitive element arranged on an image plane, wherein,
the first lens has a negative focal power, and an object side surface of the first lens is a concave surface;
an object side surface of the third lens is a concave surface;
an object side surface of the fourth lens is a concave surface; and
an axial distance from the object side surface of the first lens to the image plane TTL and ImgH, ImgH being half a diagonal length of an effective pixel area of the photosensitive element, satisfy: 1.5<TTL/ImgH<1.7.

2. The camera lens assembly according to claim 1, wherein:
the second lens has a positive focal power or a negative focal power, wherein an image side surface of the second lens is a concave surface;

the third lens has a positive focal power, wherein an image side surface of the third lens is a convex surface; and the fourth lens has a negative focal power;

the fifth lens has a positive focal power, wherein an object side surface of fifth lens is a concave surface, and an image side surface of the fifth lens is a convex surface; and the sixth lens has a positive focal power or a negative focal power.

3. The camera lens assembly according to claim 2, wherein a half of a maximum field-of-view angle HFOV of the camera lens assembly satisfies: HFOV>50°.

4. The camera lens assembly according to claim 2, wherein a center thickness of the second lens on the optical axis CT2 and a center thickness of the third lens on the optical axis CT3 satisfy: 1<CT2/CT3<1.5.

5. The camera lens assembly according to claim 2, wherein an effective focal length of the fourth lens f4 and a total effective focal length of the camera lens assembly f satisfy: −2<f4/f<−1.

6. The camera lens assembly according to claim 2, wherein an effective focal length of the third lens f3 and an effective focal length of the fifth lens f5 satisfy: 0.4<f3/f5<1.

7. The camera lens assembly according to claim 2, wherein an axial distance between an intersection point of the object side surface of the fifth lens and the optical axis and a vertex of an effective radius of the object side surface of the fifth lens SAG51 and the axial distance from the object side surface of the first lens to the image plane TTL satisfy: −0.2<SAG51/TTL<−0.1.

8. The camera lens assembly according to claim 2, wherein a radius of curvature of the object side surface of the fifth lens R9 and a radius of curvature of the image side surface of the fifth lens R10 satisfy: 1<R9/R10<1.5.

9. The camera lens assembly according to claim 2, wherein an axial spacing distance between the third lens and the fourth lens T34 and an axial spacing distance between the fifth lens and the sixth lens T56 satisfy: 0.5<T34/T56<1.2.

10. The camera lens assembly according to claim 2, wherein an effective radius of the object side surface of the first lens DT11 and an effective radius of the image side surface of the fifth lens DT52 satisfy: 0.5<DT11/DT52<1.1.

11. A camera lens assembly, comprising sequentially, from an object side to an image side along an optical axis:

a first lens, having a negative focal power, and an object side surface of the first lens being a concave surface;

a second lens, having a positive focal power or a negative focal power, and an image side surface of the second lens being a concave surface;

a third lens, having a positive focal power, and an object side surface of the third lens being a concave surface, and an image side surface of the third lens being a convex surface;

a fourth lens, having a negative focal power, and an object side surface of the fourth lens being a concave surface;

a fifth lens, having a positive focal power, and an object side surface of the fifth lens being a concave surface, and an image side surface of the fifth lens being a convex surface; and a sixth lens, having a positive focal power or a negative focal power, an axial spacing distance between the third lens and the fourth lens T34 and an axial spacing distance between the fifth lens and the sixth lens T56 satisfying: 0.5<T34/T56<1.2.

12. The camera lens assembly according to claim 11, further comprising:

a photosensitive element, arranged on an image plane, wherein an axial distance from the object side surface of the first lens to the image plane TTL and ImgH, ImgH being half a diagonal length of an effective pixel area of the photosensitive element, satisfy: 1.5<TTL/ImgH<1.7.

13. The camera lens assembly according to claim 11, wherein a half of a maximum field-of-view angle HFOV of the camera lens assembly satisfies: HFOV>50°.

14. The camera lens assembly according to claim 11, wherein a center thickness of the second lens on the optical axis CT2 and a center thickness of the third lens on the optical axis CT3 satisfy: 1<CT2/CT3<1.5.

15. The camera lens assembly according to claim 11, wherein an effective focal length of the fourth lens f4 and a total effective focal length of the camera lens assembly f satisfy: −2<f4/f<−1.

16. The camera lens assembly according to claim 11, wherein an effective focal length of the third lens f3 and an effective focal length of the fifth lens f5 satisfy: 0.4<f3/f5<1.

17. The camera lens assembly according to claim 11, wherein an axial distance between an intersection point of the object side surface of the fifth lens and the optical axis and a vertex of an effective radius of the object side surface of the fifth lens SAG51 and the axial distance from the object side surface of the first lens to the image plane TTL satisfy: −0.2<SAG51/TTL<−0.1.

18. The camera lens assembly according to claim 11, wherein a radius of curvature of the object side surface of the fifth lens R9 and a radius of curvature of the image side surface of the fifth lens R10 satisfy: 1<R9/R10<1.5.

19. The camera lens assembly according to claim 11, wherein an effective radius of the object side surface of the first lens DT11 and an effective radius of the image side surface of the fifth lens DT52 satisfy: 0.5<DT11/DT52<1.1.

20. A camera device, equipped with a camera lens assembly, the camera lens assembly comprising sequentially, from an object side to an image side along an optical axis, a first lens, a second lens, a third lens, a fourth lens, a fifth lens and a sixth lens, and a photosensitive element arranged on an image plane, wherein, the first lens has a negative focal power, and an object side surface of the first lens is a concave surface;

object side surface of the third lens is a concave surface;

an object side surface of the fourth lens is a concave surface;

an axial distance from the object side surface of the first lens to the image plane TTL and ImgH, ImgH being half a diagonal length of an effective pixel area of the photosensitive element, satisfy: 1.5<TTL/ImgH<1.7.

* * * * *